(12) United States Patent
Kawamura et al.

(10) Patent No.: US 9,181,480 B2
(45) Date of Patent: Nov. 10, 2015

(54) LIQUID CRYSTAL COMPOSITION, LIQUID CRYSTAL DISPLAY ELEMENT, AND LIQUID CRYSTAL DISPLAY

(71) Applicant: DIC CORPORATION, Tokyo (JP)

(72) Inventors: Joji Kawamura, Saitama (JP); Yoshinori Iwashita, Saitama (JP); Shinji Ogawa, Saitama (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/381,930

(22) PCT Filed: Nov. 12, 2012

(86) PCT No.: PCT/JP2012/079233
§ 371 (c)(1),
(2) Date: Aug. 28, 2014

(87) PCT Pub. No.: WO2014/073101
PCT Pub. Date: May 15, 2014

(65) Prior Publication Data
US 2015/0028256 A1    Jan. 29, 2015

(51) Int. Cl.
*G02F 1/1333* (2006.01)
*C09K 19/30* (2006.01)
*C09K 19/04* (2006.01)
*C09K 19/12* (2006.01)

(52) U.S. Cl.
CPC ..... *C09K 19/3003* (2013.01); *C09K 2019/0448* (2013.01); *C09K 2019/122* (2013.01); *C09K 2019/301* (2013.01); *C09K 2019/3004* (2013.01); *C09K 2019/3009* (2013.01); *C09K 2019/3016* (2013.01); *C09K 2019/3021* (2013.01); *C09K 2019/3027* (2013.01)

(58) Field of Classification Search
CPC .............. G02F 1/1333; C09K 19/3003; C09K 2019/0448; C09K 2019/122; C09K 2019/3004; C09K 2019/301; C09K 2019/3016; C09K 2019/3009; C09K 2019/3021; C09K 2019/3027
USPC ............... 252/299.01, 299.6, 299.63, 299.66; 428/1.1, 1.3; 349/182
See application file for complete search history.

(56) References Cited

U.S. PATENT DOCUMENTS

| 6,168,839 | B1 | 1/2001 | Fujita et al. |
| 8,168,081 | B2 * | 5/2012 | Klasen-Memmer et al. ............ 252/299.6 |
| 9,005,720 | B2 * | 4/2015 | Goetz et al. ............ 428/1.1 |
| 2003/0048401 | A1 | 3/2003 | Hanaoka et al. |
| 2005/0006624 | A1 | 1/2005 | Kato |
| 2006/0038936 | A1 | 2/2006 | Hirosawa |
| 2009/0309066 | A1 | 12/2009 | Klasen-Memmer |
| 2010/0252777 | A1 | 10/2010 | Klasen-Memmer et al. |
| 2011/0101270 | A1 | 5/2011 | Manabe et al. |
| 2012/0161072 | A1 | 6/2012 | Saito et al. |
| 2013/0335693 | A1 | 12/2013 | Klassen-Memmer et al. |
| 2014/0022473 | A1 | 1/2014 | Goetz et al. |

FOREIGN PATENT DOCUMENTS

| JP | 6-235925 A | 8/1994 |
| JP | 2002-357830 A | 12/2002 |
| JP | 2005-298466 A | 10/2005 |
| JP | 2006-058755 A | 3/2006 |
| JP | 2008-505235 A | 2/2008 |
| JP | 2010-503733 A | 2/2010 |
| JP | 2010-242086 A | 10/2010 |

(Continued)

OTHER PUBLICATIONS

International Search Report dated Dec. 4, 2012 issued in corresponding application No. PCT/JP2012/079233.

*Primary Examiner* — Geraldina Visconti
(74) *Attorney, Agent, or Firm* — Westerman, Hattori, Daniels & Adrian, LLP

(57) ABSTRACT

A liquid crystal composition having a negative dielectric anisotropy, a component (B) including at least one compound represented by formula (1.1) or formula (1.2), wherein the compound (B) is dielectrically neutral, having a dielectric anisotropy of more than −2 and less than +2; and a component (A) including at least one compound represented by formula (2.1) or formula (2.2), wherein the component (A) is dielectrically negative, having a dielectric anisotropy of −2 or less.

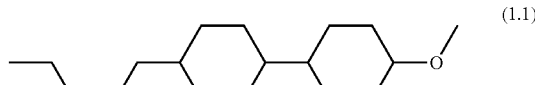

(1.1)

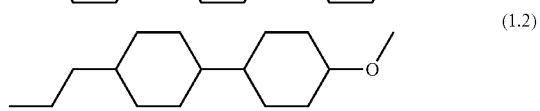

(1.2)

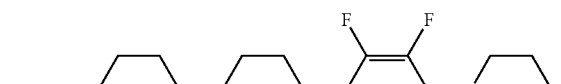

(2.1)

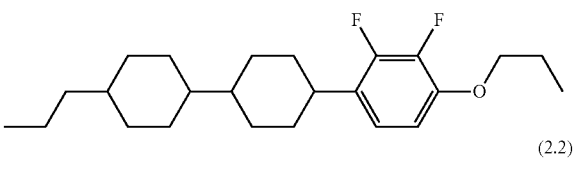

(2.2)

13 Claims, 1 Drawing Sheet

(56) References Cited

FOREIGN PATENT DOCUMENTS

| | | |
|---|---|---|
| JP | 2010-256904 A | 11/2010 |
| JP | 2011-517464 A | 6/2011 |
| JP | 2011-519985 A | 7/2011 |
| JP | 2012-509369 A | 4/2012 |
| JP | 2012-136623 A | 7/2012 |
| WO | 98/27048 A1 | 6/1998 |

* cited by examiner

LIQUID CRYSTAL COMPOSITION, LIQUID CRYSTAL DISPLAY ELEMENT, AND LIQUID CRYSTAL DISPLAY

TECHNICAL FIELD

The present invention relates to a liquid crystal composition, as well as a liquid crystal display element and a liquid crystal display, using the liquid crystal composition identified above.

TECHNICAL BACKGROUND

Liquid crystal display elements have been used in various devices such as measuring equipment, automotive panel, word processor, electronic note, printer, computer, TV, clock, advertisement panel board, and etc., including watch and electronic calculator. The representative of the liquid crystal display method includes TN (twisted nematic) type, STN (super twisted nematic) type, VA (vertical alignment) type using a TFT (thin film transistor), and IPS (in-plane switching) type. The liquid crystal composition used in the liquid crystal display element is demanded to be stable to external factors such as water, air, heat, and light. It is also demanded to exhibit a liquid crystalline phase in as wide temperature range as possible including the room temperature, as well as it is demanded to have a low viscosity and require lower drive voltage. Furthermore, the liquid crystal composition comprises several to dozens of compounds in order to obtain the most appropriate values of dielectric constant anisotropy ($\Delta\in$) or/and refractive index anisotropy ($\Delta$n) depending on individual display element.

A vertical orientation type display uses a liquid crystal composition whose $\Delta\in$ is negative, which is widely used in e.g., liquid crystal TVs. On the other hand, lower voltage drive, higher response, and wider operating temperature are demanded in all drive types. Namely, it is demanded to have a positive range of $\Delta\in$ with a larger absolute value, having a lower viscosity ($\eta$), and higher transition temperature ($T_{ni}$) between nematic phase and isotropic liquid phase. Also, by regulating the product ($\Delta$n×d) of the $\Delta$n value and a cell gap (d), it is required to adjust the $\Delta$n value of the liquid crystal composition in a suitable range in accordance with the cell gap. In addition, when the liquid crystal display element is applied to TVs, high-speed response is weighed heavily, and therefore, the liquid crystal composition is required to have a small rotational viscosity ($\gamma_1$).

Conventionally, in order to compose a liquid crystal composition having a low value of $\gamma_1$, it was usual to use a compound having a dialkylbicyclohexane frame (see Patent Reference No. 1). However, although a bicyclohexane compound exhibits a high effect to reduce the value of $\gamma_1$, generally, it tends to have a high vapor pressure, and especially, such a tendency can be remarkably found in a compound with a short alkyl chain length. In addition, $T_{ni}$ tends to be low. Therefore, as an alkylbicyclohexane compound, it is often to use a compound having a total side chain length with a carbon atom number of 7, and enough examinations have not been made for a compound having a shorter side chain length.

A liquid crystal composition was known which uses a dialkylbicyclohexane compound having a short side chain length (see Patent Reference No. 2). This composition balances the physical properties as a whole by using a compound having three ring structures as a negative dielectric constant anisotropy compound as much as possible, using a compound having a difluoroethylene frame. With respect to the difluoroethylene frame used in this composition, however, there is a problem as to its low stability with respect to the light, and therefore, it is demanded to develop a liquid crystal composition without using such a compound.

On the other hand, as the application of the liquid crystal display elements has come to spread, there have been large changes in their use and manufacturing method. In order to cope with the changes, it has been demanded to optimize the characteristics more than the basic physical properties as conventionally known. Namely, as the liquid crystal display element using the liquid crystal composition, a VA (vertical alignment) type and an IPS (in-plane switching) type have been widely used, and in addition, a display element having a super large size such as size 50 or more has become available and used. With upsizing the substrate size, as for the injection method to substrate of the liquid crystal composition, the dropping method (ODF=One Drop Fill) has been mainly adopted from conventional vacuum injection method (see Patent Reference 3). Along with this change, a problem comes to the surface when dropping a liquid crystal composition on the substrate, leaving a drop trace and causing deterioration of the display quality. Here, the drop trace is defined as a phenomenon when a trace made by dropping a liquid crystal composition appears white even in a black display.

For the purpose of high-speed response of the pretilt angle control of the liquid crystal material in the liquid crystal display element, there have been developing a PS liquid crystal display element (polymer stabilized; polymer stabilization), and a PSA liquid crystal display element (polymer sustained alignment; polymer maintenance orientation) (see Patent Reference No. 4), and therefore, the issue of the problems has been more significant. Usually, these display elements are characterized in that a monomer is added in the liquid crystal composition, and the monomer in the composition is hardened. On the other hand, a liquid crystal composition for active matrix is required to maintain a high voltage retention rate, so that a compound having an ester linkage is restricted from usage, and therefore, there are few kinds of compounds available.

As a monomer used for the PSA liquid crystal display element, an acrylate system is mainly used, and such an acrylate compound generally has an ester linkage. Acrylate compounds are usually not used as a liquid crystal compound for active matrix (see Patent Reference 4). When a large quantity of an acrylate compound is included in a liquid crystal composition for active matrix, the generation of drop trace is induced, thereby increasing the problem of the aggravation of the yield of the liquid crystal display element due to the display defectiveness. In addition, aggravation of the yield can also become problematic when the additives such as antioxidant and light absorption agent are added in the liquid crystal composition.

As a method to control the drop traces, disclosed is a method to polymerize a polymerizable compound mixed in the liquid crystal composition to form a polymer layer in the liquid crystalline layer in order to control the generating drop trace in relation with the orientational control film (Patent Reference No. 5). However, in this method, there is a problem in which there occurs ghosting in the display which is caused by to the polymerizable compound added in the liquid crystal composition, and therefore, the effect to suppress the drop trace is insufficient. Therefore, it has been demanded to develop a liquid crystal display element in which basic characteristics as liquid crystal display elements are maintained while it is unlikely to cause the ghosting and the drop trace.

PRIOR ART REFERENCES

Patent References

Patent Reference No. 1: Japanese Laid-Open Patent Publication No. 2008-505235

Patent Reference No. 2: Japanese Laid-Open Patent Publication No. 2012-136623

Patent Reference No. 3: Japanese Laid-Open Patent Publication No. H06-235925

Patent Reference No. 4: Japanese Laid-Open Patent Publication No. 2002-357830

Patent Reference No. 5: Japanese Laid-Open Patent Publication No. 2006-58755

SUMMARY OF THE INVENTION

The Objectives to Solve by the Invention

The purpose of the present invention is to provide a liquid crystal composition, liquid crystal display element using the liquid crystal composition and the liquid crystal display, having the features as follows: They are excellent in the dielectric constant anisotropy ($\Delta\epsilon$), the viscosity ($\eta$), the upper limit temperature of the nematic phase ($T_{ni}$), the stability (solubility) of the nematic phase at a low temperature, the rotational viscosity ($\gamma_1$) and the ghosting feature. They unlikely cause the drop trace at the time of the production of the liquid crystal display element, and they can be discharged stably in the ODF process.

Means to Solve the Problem

In order solve the objectives above, the inventors of the present invention have examined the structure of various kinds of liquid crystal compositions most suitable for the preparation of the liquid crystal display element by means of the dripping process, and finally reached the invention by finding that the generation of the drop trace in the liquid crystal display element could be restrained by using a specific liquid crystal compound at a specific mixture ratio. Namely, the first embodiment of the present invention includes the liquid crystal compositions (i) to (ix) below.

(i): A liquid crystal composition having a negative dielectric anisotropy, a component (B) including at least one compound represented by formula (1.1) or formula (1.2), wherein the compound (B) is dielectrically neutral, having a dielectric anisotropy of more than −2 and less than +2; and a component (A) including at least one compound represented by formula (2.1) or formula (2.2), wherein the component (A) is dielectrically negative, having a dielectric anisotropy of −2 or less.

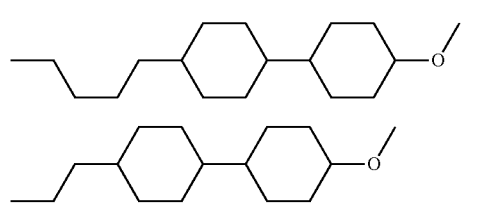

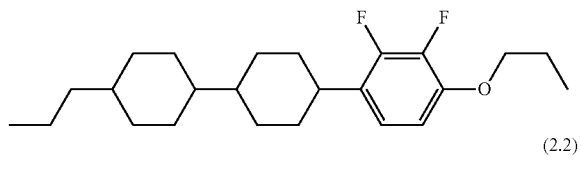

(ii): The liquid crystal composition according to Item 1, wherein the component (A) includes at least one compound represented by formula (3.1) or formula (3.2).

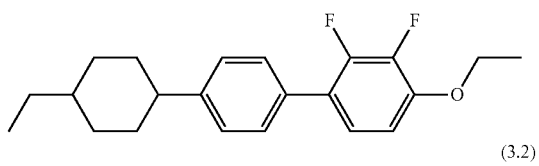

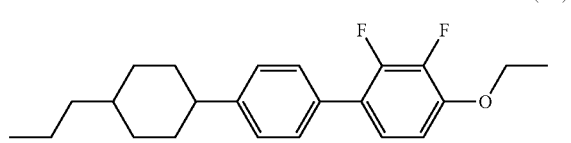

(iii): The liquid crystal composition according to Item (ii), wherein a content of the compound represented by formula (3.1) is 15 mass % or more with respect to a total amount of the liquid crystal composition.

(iv): The liquid crystal composition according to any of Items 1 to 3, wherein a content of the compound represented by formula (1.1) is 7 mass % or more with respect to a total amount of the liquid crystal composition.

(v): The liquid crystal composition according to any of Items 1 to 4, wherein the component (B) includes a compound represented by formula (4);

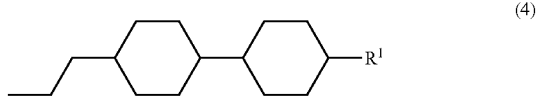

In the formula above, $R^1$ represents an alkyl group having a carbon number of 2 to 5 or an alkoxy group having a carbon number of 3 to 5.

(vi): The liquid crystal composition according to any of Items 1 to 5, wherein the component (A) includes a compound represented by formula (5) or formula (6).

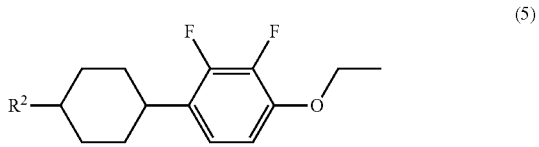

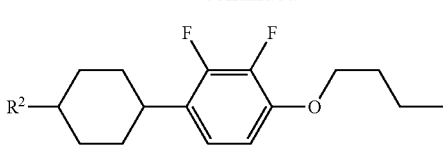

(6)

In the formula (5) and the formula (6), R2 represents an alkyl group having a carbon number of 3 to 5.

(vii): The liquid crystal composition according to any of Items 1 to 6, wherein the component (A) includes a compound represented by formula (7).

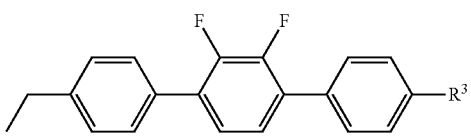

(7)

In the formula above, R3 represents an alkyl group having a carbon number of 3 or 4.

(viii): The liquid crystal composition according to any of Items 1 to 7, wherein the component (A) includes a compound represented by formula (8).

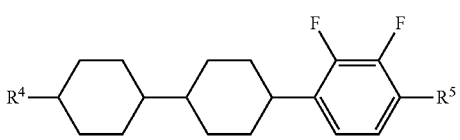

(8)

In the formula above, $R^4$ represents an alkyl group having a carbon number of 2 or 3; $R^5$ represents an alkyl group having a carbon number of 1 or 2, or an alkoxy group having a carbon number of 1 or 2.

(ix): The liquid crystal composition according to any of Items 1 to 8, wherein the component (B) includes a compound represented by formula (9).

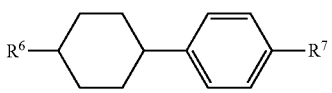

(9)

In the formula above, R6 represents an alkyl group having a carbon number of 3 or 5; R7 represents an alkyl group having a carbon number of 1 to 3, or an alkoxy group having a carbon number of 1 to 3.

The second embodiment of the present invention is a liquid crystal display element using the liquid crystal composition of the first embodiment.

The third embodiment of the present invention is a liquid crystal display using the liquid crystal display element of the second embodiment.

Effect of the Invention

The liquid crystal composition of the present invention has features of being excellent in the dielectric constant anisotropy ($\Delta\epsilon$), the viscosity ($\eta$), the upper limit temperature of the nematic phase ($T_{ni}$), the stability (solubility) of the nematic phase at a low temperature, and the rotational viscosity ($\gamma_1$), as well as can be stably discharged in the ODF process at the time of the production of the liquid crystal display element.

In addition, the liquid crystal display element using the liquid crystal composition of the present invention is superior in the high-speed response, less causing the ghosting, and thereby generating less drop traces caused due to the ODF process at the time of the production. Therefore, the liquid crystal composition of the present invention is useful for display elements such as liquid crystalline TVs and monitors.

EMBODIMENTS TO CARRY OUT THE INVENTION

Figure 1:
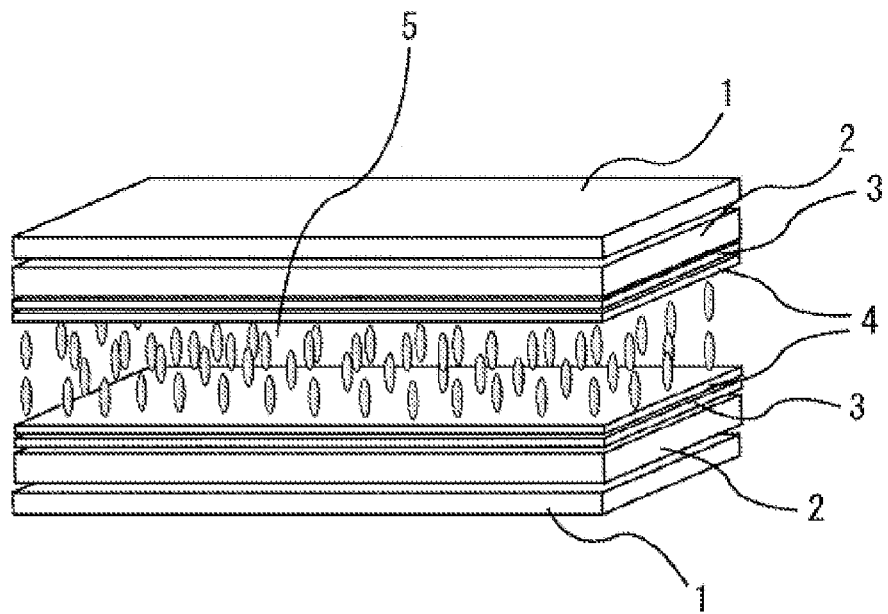
FIG. 1 is a schematic drawing showing an example of the structure of the liquid crystal display element of the second embodiment of the present invention.

As explained before, the detailed process to cause the drop traces have not made clear at present. However, it is considered that the impurities in the liquid crystal compounds (liquid crystal composition), interactions of the oriented film, the chromatographic phenomenon, etc. are more likely to be related to the generation of the drop traces. Whether or not the liquid crystal compounds include impurities significantly depends on the manufacturing process of such compounds. Generally, with respect to the manufacturing method of a liquid crystal compound, the processes and raw materials that are most suitable for each particular compound are considered. Even if a compound is similar to other known compounds, and for example, the difference is even in the number of the side chain, it cannot be said that the process is similar to or the same as the process of such known compounds. Since a liquid crystal compound is manufactured through precise manufacturing processes, the costs are high among chemical products, and therefore, it has been strongly demanded to improve the production efficiency. In this way, in order to use raw material that is as cheap as possible, even when producing a similar compound having a side chain number of one difference, there may be sometimes a way to produce it at better efficiency if producing from raw material that is different at all, instead of known raw materials. Therefore, the manufacturing processes of the liquid crystal material (liquid crystal composition) may be different for each every material, and it is most often that the raw material is different even if the process is the same. As a result, different impurities are often contaminated in each material. On the other hand, the drop trace may be caused by very small amount of impurities, and therefore, there is a limit to suppress the generation of the drop trace if the material is relied only upon purification.

On the other hand, the manufacturing methods of generally used liquid crystal materials tend to be unchanged once the manufacturing processes of such materials are established. Even in the present when analysis technique has been advanced, it is not easy to completely make clear the kinds of impurities contaminated, but it is necessary to design a liquid crystal composition assuming that each material is contaminated with impurities as defined.

The inventors of the present application has examined the relationship between impurities of the liquid crystal materials and drop traces, and as a result, it has been found through experiences that among the impurities included in the liquid crystal composition, there are ones which hardly cause drop traces, and there are other ones which easily cause drop traces. Furthermore, in order to suppress the generation of the drop traces, it has been found important to use a liquid crystal composition including a specific compound at a specific mixture ratio. Namely, the liquid crystal composition of the present invention is a composition in which drop traces are particularly hard to be caused. The preferable embodiments listed below have been found in the viewpoint above.

The present invention is explained in detail, but the present invention is not limited thereto.

Unless otherwise stated, the indication of "%" in the following explanation means "mass %."

<<Liquid Crystal Composition>>

The liquid crystal composition of the first embodiment of the present invention is a liquid crystal composition having a negative dielectric anisotropy, including component (A) and component (B).

The component (A) includes at least one compound represented by formula (2.1) or formula (2.2), and is dielectrically negative, having a dielectric anisotropy of −2 or less.

The component (B) includes at least one compound represented by formula (1.1) or formula (1.2), and is dielectrically neutral, having a dielectric anisotropy of more than −2 and less than +2.

The dielectric anisotropy of each component as well as the dielectric anisotropy of the liquid crystal composition are values measured at 25° C. by means of general method.

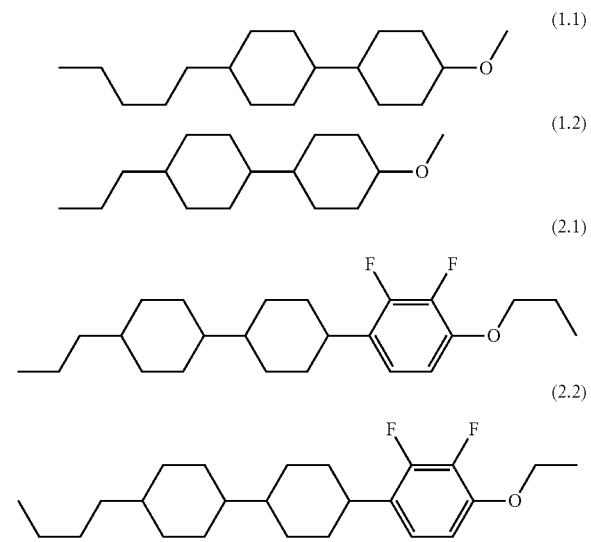

Hereinafter, the compounds represented by formula (1.1), formula (1.2), formula (2.1) and formula (2.2) are referred to as compound (1.1), compound (1.2), compound (2.1) and compound (2.2), respectively.

It is preferable that the content of the compound (1.1) in the liquid crystal composition is 7% or more with respect to the total mass of the liquid crystal composition. The content above can be 1-35% in one embodiment of the present invention. The content above can be 10-25% in another embodiment of the present invention. The content above can be 15-21% in yet another embodiment of the present invention.

The content of the compound (1.2) in the liquid crystal composition is not particularly limited. The content above can be 1-30% in one embodiment of the present invention. The content above can be 1-2% in another embodiment of the present invention. The content above can be 18-25% in yet another embodiment of the present invention.

The content of the compound (2.1) in the liquid crystal composition is not particularly limited. The content above can be 1-25% in one embodiment of the present invention. The content above can be 1-6% in another embodiment of the present invention. The content above can be 13-18% in yet another embodiment of the present invention.

The content of the compound (2.2) in the liquid crystal composition is not particularly limited. The content above can be 1-20% in one embodiment of the present invention. The content above can be 2-15% in another embodiment of the present invention. The content above can be 4-10% in yet another embodiment of the present invention.

The total content of the compound (1.1) and the compound (1.2) in the liquid crystal composition is not particularly limited. The content above can be 1-40% in one embodiment of the present invention. The content above can be 5-25% in another embodiment of the present invention. The content above can be 10-20% in yet another embodiment of the present invention.

The total content of the compound (2.1) and the compound (2.2) in the liquid crystal composition is not particularly limited. The content above can be 1-25% in one embodiment of the present invention. The content above can be 6-20% in another embodiment of the present invention. The content above can be 10-20% in yet another embodiment of the present invention.

The total content of the compound (1.1), the compound (1.2), the compound (2.1) and the compound (2.2) in the liquid crystal composition is not particularly limited. The content above can be 5-60% in one embodiment of the present invention. The content above can be 10-40% in another embodiment of the present invention. The content above can be 15-25% in yet another embodiment of the present invention.

When the compound (1.1) and the compound (2.1) are used in combination, the content of each compound in the liquid crystal composition can be exemplified as an embodiment as follows.

The content of the compound (1.1) is 2-25%, and the content of the compound (2.1) is 1-16%, in one embodiment of the present invention.

The content of the compound (1.1) is 4-12%, and the content of the compound (2.1) is 1-6%, in another embodiment of the present invention.

The content of the compound (1.1) is 18-25%, and the content of the compound (2.1) is 10-16%, in yet another embodiment of the present invention.

When the compound (1.1) and the compound (2.2) are used in combination, the content of each compound in the liquid crystal composition can be exemplified as an embodiment as follows.

The content of the compound (1.1) is 5-30%, and the content of the compound (2.2) is 1-10%, in one embodiment of the present invention.

The content of the compound (1.1) is 17-25%, and the content of the compound (2.2) is 2-7%, in another embodiment of the present invention.

The content of the compound (1.1) is 19-23%, and the content of the compound (2.2) is 3-5%, in yet another embodiment of the present invention.

When the compound (1.2) and the compound (2.1) are used in combination, the content of each compound in the liquid crystal composition can be exemplified as an embodiment as follows.

The content of the compound (1.2) is 1-30%, and the content of the compound (2.1) is 5-20%, in one embodiment of the present invention.

The content of the compound (1.2) is 20-25%, and the content of the compound (2.1) is 12-16%, in another embodiment of the present invention.

The content of the compound (1.2) is 2-6%, and the content of the compound (2.1) is 6-11%, in yet another embodiment of the present invention.

When the compound (1.2) and the compound (2.2) are used in combination, the content of each compound in the liquid crystal composition can be exemplified as an embodiment as follows.

The content of the compound (1.2) is 1-30%, and the content of the compound (2.2) is 1-20%, in one embodiment of the present invention.

The content of the compound (1.2) is 20-30%, and the content of the compound (2.2) is 1-5%, in another embodiment of the present invention.

The content of the compound (1.2) is 1-5%, and the content of the compound (2.2) is 5-10%, in yet another embodiment of the present invention.

The component (A) can include at least one compound represented by formula (3.1) or formula (3.2).

Hereinafter, the compounds represented by formula (3.1) and formula (3.2) are referred to as compound (3.1) and compound (3.2), respectively.

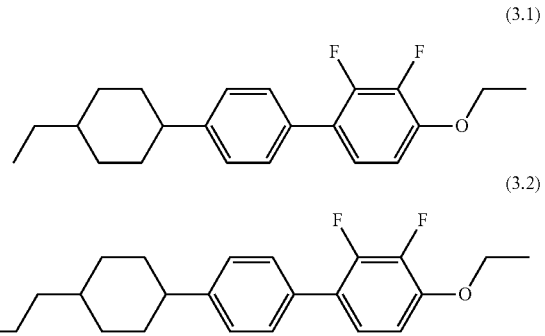

It is preferable that the content of the compound (3.1) is 15% or more with respect to the total mass of the liquid crystal composition. The content above can be 1-30% in one embodiment of the present invention. The content above can be 1-4% in another embodiment of the present invention. The content above can be 14-20% in yet another embodiment of the present invention.

The content of the compound (3.2) in the liquid crystal composition is not particularly limited. The content above can be 1-25% in one embodiment of the present invention. The content above can be 13-25% in another embodiment of the present invention. The content above can be 15-20% in yet another embodiment of the present invention.

The total content of the compound (3.1) and the compound (3.2) in the liquid crystal composition is not particularly limited. The content above can be 1-35% in one embodiment of the present invention. The content above can be 5-25% in another embodiment of the present invention. The content above can be 10-20% in yet another embodiment of the present invention.

The total content of the compound (1.1), the compound (1.2), the compound (2.1), the compound (2.2) the compound (3.1) and the compound (3.2) in the liquid crystal composition is not particularly limited. The content above can be 10-90% in one embodiment of the present invention. The content above can be 20-80% in another embodiment of the present invention. The content above can be 30-70% in yet another embodiment of the present invention.

The component (B) can include a compound represented by formula (4).

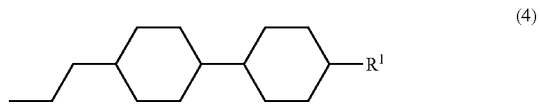

In the formula above, $R^1$ represents an alkyl group having a carbon number of 2 to 5 or an alkoxy group having a carbon number of 3 to 5.

The total content of the group of the compounds represented by formula (4) in the liquid crystal composition is not particularly limited. The content above can be 10-40% in one embodiment of the present invention. The content above can be 15-35% in another embodiment of the present invention. The content above can be 20-30% in yet another embodiment of the present invention.

The total content of the compounds represented by formula (1.1), formula (1.2), formula (2.1), formula (2.2) and formula (4) in the liquid crystal composition is not particularly limited. The content above can be 30-70% in one embodiment of the present invention. The content above can be 35-60% in another embodiment of the present invention. The content above can be 40-55% in yet another embodiment of the present invention.

The total content of the compounds represented by formula (1.1), formula (1.2), formula (2.1), formula (2.2) formula (3.1), formula (3.2) and formula (4) in the liquid crystal composition is not particularly limited. The content above can be 35-90% in one embodiment of the present invention. The content above can be 40-80% in another embodiment of the present invention. The content above can be 45-70% in yet another embodiment of the present invention.

The example of the compound represented by formula (4) can include the compounds represented by formula (4.0) to formula (4.6) (which are hereinafter referred to as compound (4.0) to compound (4.6), respectively).

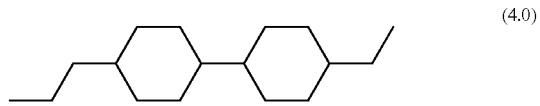

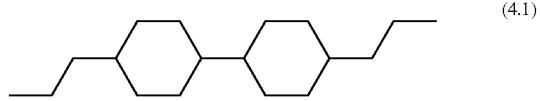

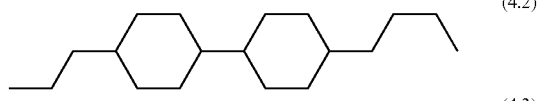

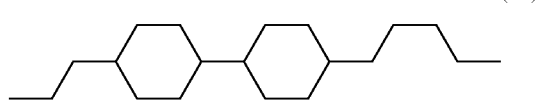

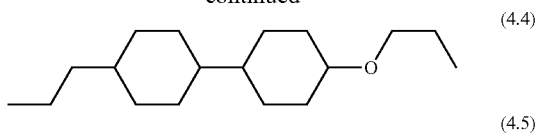
(4.4)

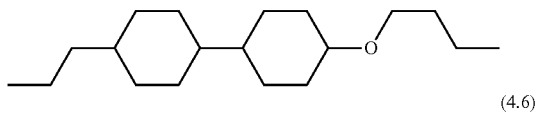
(4.5)

(4.6)

The content of the compound (4.0) in the liquid crystal composition is not particularly limited. The content above can be 5-35% in one embodiment of the present invention. The content above can be 10-30% in another embodiment of the present invention. The content above can be 15-25% in yet another embodiment of the present invention.

The content of the compound (4.1) in the liquid crystal composition is not particularly limited. The content above can be 5-35% in one embodiment of the present invention. The content above can be 10-30% in another embodiment of the present invention. The content above can be 15-25% in yet another embodiment of the present invention.

The content of the compound (4.2) in the liquid crystal composition is not particularly limited. The content above can be 2-30% in one embodiment of the present invention. The content above can be 5-25% in another embodiment of the present invention. The content above can be 10-20% in yet another embodiment of the present invention.

The content of the compound (4.3) in the liquid crystal composition is not particularly limited. The content above can be 2-30% in one embodiment of the present invention. The content above can be 5-20% in another embodiment of the present invention. The content above can be 5-10% in yet another embodiment of the present invention.

The content of the compound (4.4) in the liquid crystal composition is not particularly limited. The content above can be 2-30% in one embodiment of the present invention. The content above can be 5-20% in another embodiment of the present invention. The content above can be 5-10% in yet another embodiment of the present invention.

The content of the compound (4.5) in the liquid crystal composition is not particularly limited. The content above can be 2-30% in one embodiment of the present invention. The content above can be 5-20% in another embodiment of the present invention. The content above can be 5-10% in yet another embodiment of the present invention.

The content of the compound (4.6) in the liquid crystal composition is not particularly limited. The content above can be 2-30% in one embodiment of the present invention. The content above can be 5-20% in another embodiment of the present invention. The content above can be 5-10% in yet another embodiment of the present invention.

When the compound (4.0) and the compound (4.2) are used in combination, the content of each compound in the liquid crystal composition can be exemplified as an embodiment as follows.

The content of the compound (4.0) is 15-30%, and the content of the compound (4.2) is 2-15%, in one embodiment of the present invention.

The content of the compound (4.0) is 18-27%, and the content of the compound (4.2) is 2-10%, in another embodiment of the present invention.

The content of the compound (4.0) is 20-25%, and the content of the compound (4.2) is 2-5%, in yet another embodiment of the present invention.

When the compound (4.0) and the compound (4.2) as well as at least one of the compound (1.2) and the compound (2.2) are used in combination, the content of each compound in the liquid crystal composition can be exemplified as an embodiment as follows.

The content of the compound (4.0) is 15-30%, and the content of the compound (4.2) is 2-15%, the content of the compound (1.2) is 1-10%, and the content of the compound (2.2) is 2-12%, in one embodiment of the present invention.

The content of the compound (4.0) is 18-27%, and the content of the compound (4.2) is 2-10%, the content of the compound (1.2) is 1-7%, and the content of the compound (2.2) is 3-10%, in another embodiment of the present invention.

The content of the compound (4.0) is 20-25%, and the content of the compound (4.2) is 2-5%, the content of the compound (1.2) is 1-4%, and the content of the compound (2.2) is 4-8%, in yet another embodiment of the present invention.

When the compound (4.2) is used in combination with at least one of the compound (1.1), the compound (2.1) and the compound (3.1), the content of each compound in the liquid crystal composition can be exemplified as an embodiment as follows.

The content of the compound (4.2) is 3-10%, the content of the compound (1.1) is 12-30%, the content of the compound (2.1) is 10-20%, and the content of the compound (3.1) is 10-25%, in one embodiment of the present invention.

The content of the compound (4.2) is 4-9%, the content of the compound (1.1) is 16-26%, the content of the compound (2.1) is 14-17%, and the content of the compound (3.1) is 15-22%, in another embodiment of the present invention.

The content of the compound (4.2) is 5-8%, the content of the compound (1.1) is 20-23%, the content of the compound (2.1) is 12-15%, and the content of the compound (3.1) is 17-20%, in yet another embodiment of the present invention.

The component (A) can include a compound represented by formula (5) or formula (6).

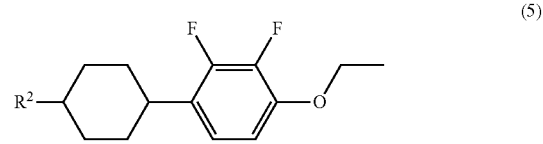
(5)

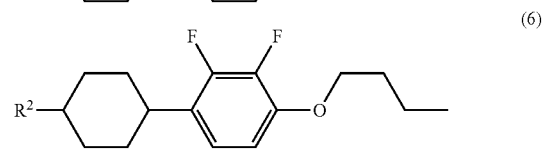
(6)

In the formula (5) and the formula (6), R2 represents an alkyl group having a carbon number of 3 to 5.

The total content of the group of the compounds represented by formula (5) and formula (6) in the liquid crystal composition is not particularly limited. The content above can be 8-30% in one embodiment of the present invention. The content above can be 11-27% in another embodiment of the present invention. The content above can be 14-24% in yet another embodiment of the present invention.

The total content of the group of the compounds represented by formula (1.1), formula (1.2), formula (2.1), formula (2.2), formula (5) and formula (6) in the liquid crystal composition is not particularly limited. The content above can be 25-90% in one embodiment of the present invention. The content above can be 30-75% in another embodiment of the present invention. The content above can be 35-60% in yet another embodiment of the present invention.

The total content of the compounds represented by formula (1.1), formula (1.2), formula (2.1), formula (2.2) formula (3.1), formula (3.2), formula (5) and formula (6) in the liquid crystal composition is not particularly limited. The content above can be 35-100% in one embodiment of the present invention. The content above can be 45-90% in another embodiment of the present invention. The content above can be 50-80% in yet another embodiment of the present invention.

The examples of the compounds represented by formula (5) and formula (6) can include: the compounds represented by formula (5.1) to formula (5.3) (which are hereinafter referred to as compound (5.1) to compound (5.3), respectively); and the compounds represented by formula (6.1) to formula (6.3) (which are hereinafter referred to as compound (6.1) to compound (6.3), respectively).

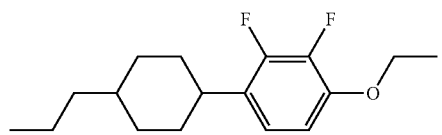

(5.1)

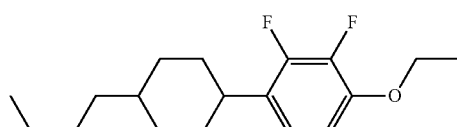

(5.2)

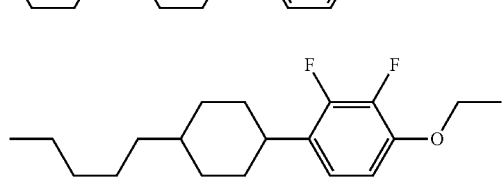

(5.3)

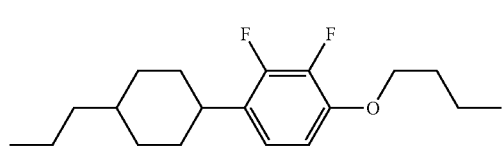

(6.1)

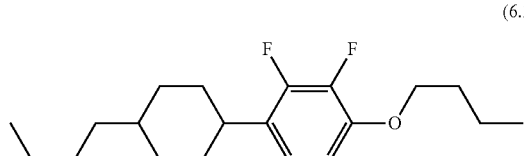

(6.2)

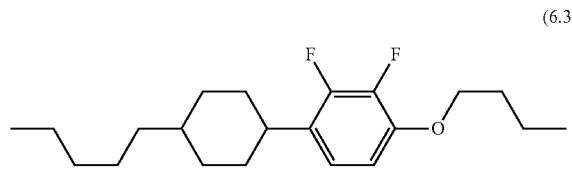

(6.3)

The content of the compound (5.1) in the liquid crystal composition is not particularly limited. The content above can be 2-20% in one embodiment of the present invention. The content above can be 4-18% in another embodiment of the present invention. The content above can be 6-16% in yet another embodiment of the present invention.

The content of the compound (5.2) in the liquid crystal composition is not particularly limited. The content above can be 2-20% in one embodiment of the present invention. The content above can be 4-18% in another embodiment of the present invention. The content above can be 6-16% in yet another embodiment of the present invention.

The content of the compound (5.3) in the liquid crystal composition is not particularly limited. The content above can be 1-20% in one embodiment of the present invention. The content above can be 2-15% in another embodiment of the present invention. The content above can be 3-10% in yet another embodiment of the present invention.

The content of the compound (6.1) in the liquid crystal composition is not particularly limited. The content above can be 3-30% in one embodiment of the present invention. The content above can be 5-25% in another embodiment of the present invention. The content above can be 10-20% in yet another embodiment of the present invention.

The content of the compound (6.2) in the liquid crystal composition is not particularly limited. The content above can be 3-30% in one embodiment of the present invention. The content above can be 5-25% in another embodiment of the present invention. The content above can be 10-20% in yet another embodiment of the present invention.

The content of the compound (6.3) in the liquid crystal composition is not particularly limited. The content above can be 1-30% in one embodiment of the present invention. The content above can be 2-20% in another embodiment of the present invention. The content above can be 3-10% in yet another embodiment of the present invention.

The component (A) can include a compound represented by formula (7).

(7)

In the formula above, $R^3$ represents an alkyl group having a carbon number of 3 or 4.

The total content of the group of the compounds represented by formula (7) in the liquid crystal composition is not particularly limited. The content above can be 1-30% in one embodiment of the present invention. The content above can be 3-20% in another embodiment of the present invention. The content above can be 6-15% in yet another embodiment of the present invention.

The total content of the compounds represented by formula (1.1), formula (1.2), formula (2.1), formula (2.2) and formula (7) in the liquid crystal composition is not particularly limited. The content above can be 10-40% in one embodiment of the present invention. The content above can be 15-35% in another embodiment of the present invention. The content above can be 20-30% in yet another embodiment of the present invention.

The total content of the compounds represented by formula (1.1), formula (1.2), formula (2.1), formula (2.2) formula (3.1), formula (3.2) and formula (7) in the liquid crystal composition is not particularly limited. The content above can be 25-60% in one embodiment of the present invention. The content above can be 30-50% in another embodiment of the present invention. The content above can be 35-45% in yet another embodiment of the present invention.

The examples of the compound represented by formula (7) can include the compounds represented by formula (7.1) to formula (7.2) (which are hereinafter referred to as compound (7.1) to compound (7.2), respectively). である

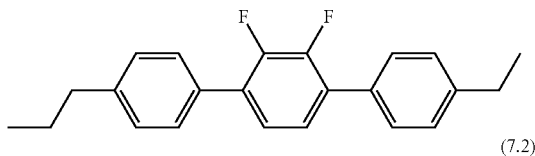

(7.1)

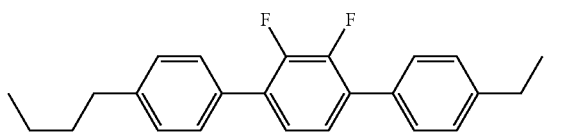

(7.2)

The content of the compound (7.1) in the liquid crystal composition is not particularly limited. The content above can be 3-25% in one embodiment of the present invention. The content above can be 5-20% in another embodiment of the present invention. The content above can be 8-15% in yet another embodiment of the present invention.

The content of the compound (7.2) in the liquid crystal composition is not particularly limited. The content above can be 1-20% in one embodiment of the present invention. The content above can be 2-15% in another embodiment of the present invention. The content above can be 3-10% in yet another embodiment of the present invention.

When the compound (7.1) and the compound (1.1) are used in combination, the content of each compound in the liquid crystal composition can be exemplified as an embodiment as follows.

The content of the compound (7.1) is 5-20%, and the content of the compound (1.1) is 10-20%, in one embodiment of the present invention.

The content of the compound (7.1) is 8-12%, and the content of the compound (1.1) is 12-17%, in another embodiment of the present invention.

The content of the compound (7.1) is 10-13%, and the content of the compound (1.1) is 12-15%, in yet another embodiment of the present invention.

The component (A) can include a compound represented by formula (8).

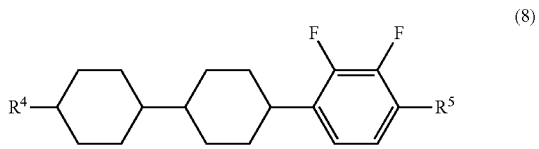

(8)

In the formula above, $R^4$ represents an alkyl group having a carbon number of 2 or 3; $R^5$ represents an alkyl group having a carbon number of 1 or 2, or an alkoxy group having a carbon number of 1 or 2.

The total content of the group of the compounds represented by formula (8) in the liquid crystal composition is not particularly limited. The content above can be 2-40% in one embodiment of the present invention. The content above can be 10-35% in another embodiment of the present invention. The content above can be 10-25% in yet another embodiment of the present invention.

The total content of the compounds represented by formula (1.1), formula (1.2), formula (2.1), formula (2.2) and formula (8) in the liquid crystal composition is not particularly limited. The content above can be 10-60% in one embodiment of the present invention. The content above can be 18-50% in another embodiment of the present invention. The content above can be 24-40% in yet another embodiment of the present invention.

The total content of the compounds represented by formula (1.1), formula (1.2), formula (2.1), formula (2.2) formula (3.1), formula (3.2) and formula (8) in the liquid crystal composition is not particularly limited. The content above can be 30-70% in one embodiment of the present invention. The content above can be 35-55% in another embodiment of the present invention. The content above can be 35-45% in yet another embodiment of the present invention.

The examples of the compound represented by formula (8) can include the compounds represented by formula (8.1) to formula (8.8) (which are hereinafter referred to as compound (8.1) to compound (8.8), respectively).

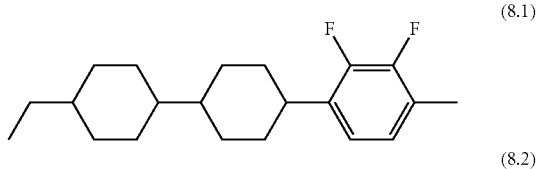

(8.1)

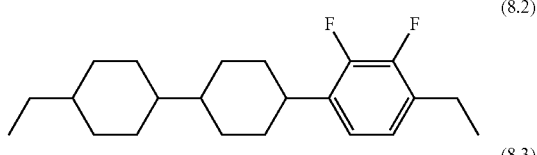

(8.2)

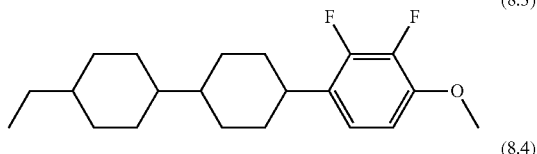

(8.3)

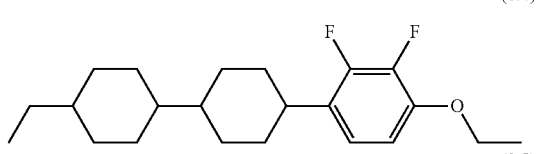

(8.4)

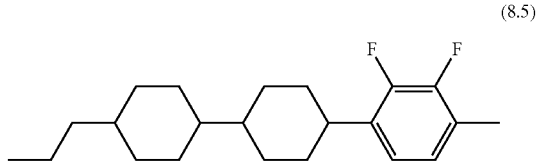

(8.5)

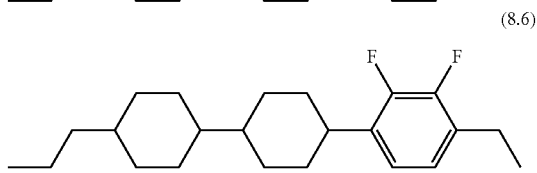

(8.6)

(8.7)

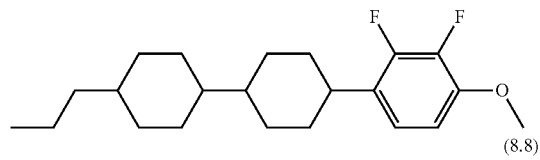

(8.8)

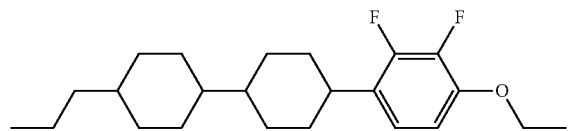

The content of the compound (8.1) in the liquid crystal composition is not particularly limited. The content above can be 3-25% in one embodiment of the present invention. The content above can be 5-20% in another embodiment of the present invention. The content above can be 8-15% in yet another embodiment of the present invention.

The content of the compound (8.2) in the liquid crystal composition is not particularly limited. The content above can be 3-25% in one embodiment of the present invention. The content above can be 5-20% in another embodiment of the present invention. The content above can be 8-15% in yet another embodiment of the present invention.

The content of the compound (8.3) in the liquid crystal composition is not particularly limited. The content above can be 3-25% in one embodiment of the present invention. The content above can be 5-20% in another embodiment of the present invention. The content above can be 8-15% in yet another embodiment of the present invention.

The content of the compound (8.4) in the liquid crystal composition is not particularly limited. The content above can be 3-25% in one embodiment of the present invention. The content above can be 5-20% in another embodiment of the present invention. The content above can be 8-15% in yet another embodiment of the present invention.

The content of the compound (8.5) in the liquid crystal composition is not particularly limited. The content above can be 3-25% in one embodiment of the present invention. The content above can be 5-20% in another embodiment of the present invention. The content above can be 8-15% in yet another embodiment of the present invention.

The content of the compound (8.6) in the liquid crystal composition is not particularly limited. The content above can be 3-25% in one embodiment of the present invention. The content above can be 5-20% in another embodiment of the present invention. The content above can be 8-15% in yet another embodiment of the present invention.

The content of the compound (8.7) in the liquid crystal composition is not particularly limited. The content above can be 3-25% in one embodiment of the present invention. The content above can be 5-20% in another embodiment of the present invention. The content above can be 8-15% in yet another embodiment of the present invention.

The content of the compound (8.8) in the liquid crystal composition is not particularly limited. The content above can be 3-25% in one embodiment of the present invention. The content above can be 4-20% in another embodiment of the present invention. The content above can be 6-12% in yet another embodiment of the present invention.

The component (B) can include a compound represented by formula (9).

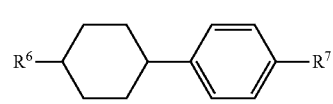

(9)

In the formula above, $R^6$ represents an alkyl group having a carbon number of 3 or 5; $R^7$ represents an alkyl group having a carbon number of 1 to 3, or an alkoxy group having a carbon number of 1 to 3.

The content of the group of the compounds represented by formula (9) in the liquid crystal composition is not particularly limited. The content above can be 2-20% in one embodiment of the present invention. The content above can be 2-15% in another embodiment of the present invention. The content above can be 2-10% in yet another embodiment of the present invention.

The total content of the compounds represented by formula (1.1), formula (1.2), formula (2.1), formula (2.2) and formula (9) in the liquid crystal composition is not particularly limited. The content above can be 5-40% in one embodiment of the present invention. The content above can be 10-30% in another embodiment of the present invention. The content above can be 15-25% in yet another embodiment of the present invention.

The total content of the compounds represented by formula (1.1), formula (1.2), formula (2.1), formula (2.2) formula (3.1), formula (3.2) and formula (9) in the liquid crystal composition is not particularly limited. The content above can be 25-60% in one embodiment of the present invention. The content above can be 35-50% in another embodiment of the present invention. The content above can be 35-45% in yet another embodiment of the present invention.

The examples of the compound represented by formula (9) can include the compounds represented by formula (9.1) to formula (9.12) (which are hereinafter referred to as compound (9.1) to compound (9.12), respectively).

(9.1)

(9.2)

(9.3)

(9.4)

(9.5)

(9.6)

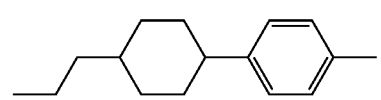
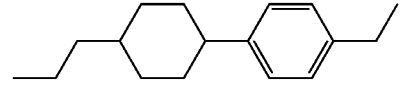
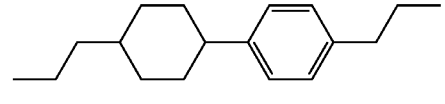
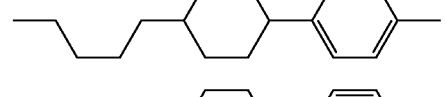
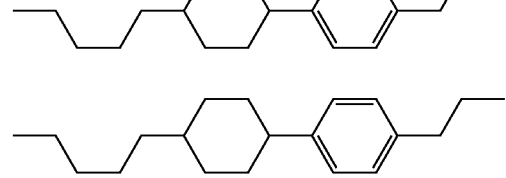

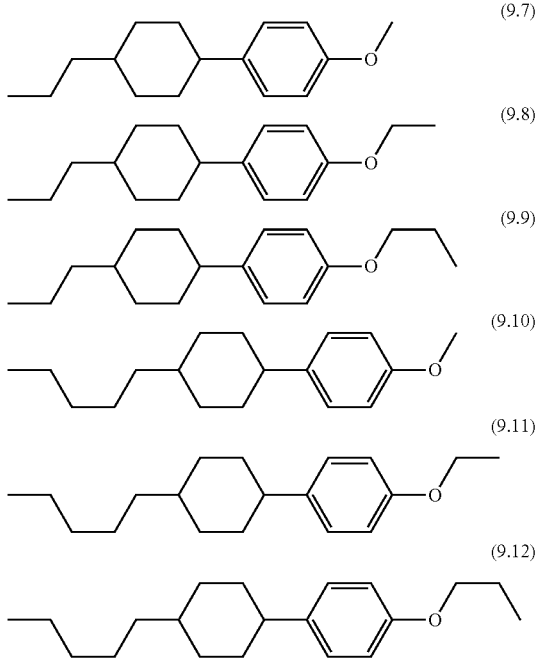

The content of the compound (9.1) in the liquid crystal composition is not particularly limited. The content above can be 1-25% in one embodiment of the present invention. The content above can be 1-12% in another embodiment of the present invention. The content above can be 1-6% in yet another embodiment of the present invention.

The content of the compound (9.2) in the liquid crystal composition is not particularly limited. The content above can be 1-25% in one embodiment of the present invention. The content above can be 1-12% in another embodiment of the present invention. The content above can be 1-6% in yet another embodiment of the present invention.

The content of the compound (9.3) in the liquid crystal composition is not particularly limited. The content above can be 1-25% in one embodiment of the present invention. The content above can be 1-12% in another embodiment of the present invention. The content above can be 1-6% in yet another embodiment of the present invention.

The content of the compound (9.4) in the liquid crystal composition is not particularly limited. The content above can be 1-25% in one embodiment of the present invention. The content above can be 1-12% in another embodiment of the present invention. The content above can be 1-6% in yet another embodiment of the present invention.

The content of the compound (9.5) in the liquid crystal composition is not particularly limited. The content above can be 1-25% in one embodiment of the present invention. The content above can be 1-12% in another embodiment of the present invention. The content above can be 1-6% in yet another embodiment of the present invention.

The content of the compound (9.6) in the liquid crystal composition is not particularly limited. The content above can be 1-25% in one embodiment of the present invention. The content above can be 1-12% in another embodiment of the present invention. The content above can be 1-6% in yet another embodiment of the present invention.

The content of the compound (9.7) in the liquid crystal composition is not particularly limited. The content above can be 2-25% in one embodiment of the present invention. The content above can be 4-18% in another embodiment of the present invention. The content above can be 6-12% in yet another embodiment of the present invention.

The content of the compound (9.8) in the liquid crystal composition is not particularly limited. The content above can be 2-25% in one embodiment of the present invention. The content above can be 4-18% in another embodiment of the present invention. The content above can be 6-12% in yet another embodiment of the present invention.

The content of the compound (9.9) in the liquid crystal composition is not particularly limited. The content above can be 2-25% in one embodiment of the present invention. The content above can be 4-18% in another embodiment of the present invention. The content above can be 6-12% in yet another embodiment of the present invention.

The content of the compound (9.10) in the liquid crystal composition is not particularly limited. The content above can be 2-25% in one embodiment of the present invention. The content above can be 4-18% in another embodiment of the present invention. The content above can be 6-12% in yet another embodiment of the present invention.

The content of the compound (9.11) in the liquid crystal composition is not particularly limited. The content above can be 2-25% in one embodiment of the present invention. The content above can be 4-18% in another embodiment of the present invention. The content above can be 6-12% in yet another embodiment of the present invention.

The content of the compound (9.12) in the liquid crystal composition is not particularly limited. The content above can be 2-25% in one embodiment of the present invention. The content above can be 4-18% in another embodiment of the present invention. The content above can be 6-12% in yet another embodiment of the present invention.

When the compound (9.7) is used in combination with at least one of the compound (1.2) and the compound (2.2), the content of each compound in the liquid crystal composition can be exemplified as an embodiment as follows.

The content of the compound (9.7) is 4-20%, the content of the compound (1.2) is 2-20%, and the content of the compound (2.2) is 4-20%, in one embodiment of the present invention.

The content of the compound (9.7) is 6-13%, the content of the compound (1.2) is 3-10%, and the content of the compound (2.2) is 6-13%, in another embodiment of the present invention.

The content of the compound (9.7) is 8-11%, the content of the compound (1.2) is 4-7%, and the content of the compound (2.2) is 8-11%, in yet another embodiment of the present invention.

The component (A) can include a compound represented by formula (a1).

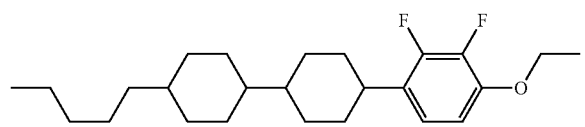

The content of the compound represented by formula (a1) in the liquid crystal composition is preferably 2-20%, and more preferably 5-16%, and yet more preferably 7-13%.

The component (A) can include a compound represented by formula (a2).

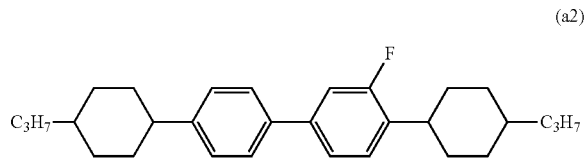

(a2)

The content of the compound represented by formula (a2) in the liquid crystal composition is preferably 1-10%, and more preferably 1-6%, and yet more preferably 1-4%.

The compound represented by the compounds (a2) is preferably used in combination with at least one of the compound (4.2), the compound (3.1), the compound (1.1) and the compound (2.1).

The component (B) can additionally include a compound represented by formula (b1).

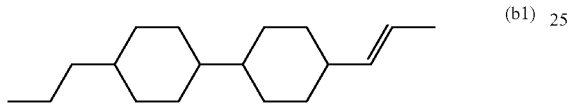

(b1)

The content of the compound represented by formula (b1) in the liquid crystal composition is preferably 1-25%, and more preferably 5-20%, and yet more preferably 7-15%.

In the liquid crystal composition, the ratio of the compound having a fluorine atomic number of 2 or more, that is, the compound represented by formula (2.1), formula (2.2), formula (3.1), formula (3.2), formula (5.1) to formula (5.3), formula (6.1) to formula (6.3), formula (7.1), formula (7.2), formula (8.1) to formula (8.8) and formula (a1) is not particularly limited. The content above can be 50-90% in one embodiment of the present invention. The content above can be 55-85% in another embodiment of the present invention. The content above can be 60-70% in yet another embodiment of the present invention.

<<Mixture Ratio of Component (A) and Component (B)>>

In the liquid crystal composition, the inclusion ratio (mixture ratio) of the component (A) that is dielectrically negative and the component (B) that is dielectrically neutral is not particularly limited so long as the liquid crystal composition as prepared has a negative dielectric anisotropy. However, it is preferable that the component (A) is included more than the component (B).

In detail, in the liquid crystal composition, it is preferable that the component (A) having a negative dielectric anisotropy is preferably included at 50% or more, and more preferably at 55-90%, and yet more preferably 55-85%.

<<Dielectric Anisotropy (Δ∈)>>

The dielectric anisotropy (Δ∈) of the liquid crystal composition of the present invention is, at 25° C., preferably −2.0 to −5.0, and more preferably −2.5 to −4.5, and yet more preferably −3.0 to −4.0. More in detail, when the response speed is given weight to consideration, it is preferable to be −2.3 to −3.4, and on the other hand, when the drive voltage is given weight to consideration, it is preferable to be −3.4 to −4.0.

<<Refractive Index Anisotropy (Δn)>>

The refractive index anisotropy (Δn) of the liquid crystal composition of the present invention is, at 25° C., preferably 0.08 to 0.13, and more preferably 0.085 to 0.125, and yet more preferably 0.09 to 0.12. More in detail, when dealing with a thin cell gap, it is preferable to be 0.10 to 0.12, and on the other hand, when dealing with a thick cell gap, it is preferable to be 0.08 to 0.10.

<<Rotational Viscosity ($\gamma_1$)>>

The rotational viscosity (η) of the liquid crystal composition of the present invention is, at 25° C., preferably 220 mPa·s or less, and more preferably 200 mPa·s or less, and yet more preferably 180 mPa·s or less, and particularly preferably 160 mPa·s or less.

In the liquid crystal composition of the present invention, it is preferable that a function Z regarding the rotational viscosity and the refractive index anisotropy satisfies with a specific value.

$$Z = \gamma 1 / \Delta n^2$$

In the formula, $\gamma_i$ is a rotational viscosity, and Δn is a refractive index anisotropy.

Z is preferably 25,000 or less, and more preferably 20,000 or less, and yet more preferably 15,000 or less.

<<Viscosity (η)>>

The viscosity (η) of the liquid crystal composition of the present invention is, at 20° C., preferably 34 mPa·s or less, and more preferably 30 mPa·s or less, and yet more preferably 26 mPa·s or less, and particularly preferably 22 mPa·s or less.

As for the specific resistivity of the liquid crystal composition of the present invention, when used as an active matrix display element, it is preferably 1011 (Ω·m) or more, and more preferably 1012 (Ω·m) or more, and yet more preferably 1013 (Ω·m) or more, and particularly preferably 1014 (Ω·m) or more.

<<Component (C): Other Component>>

The liquid crystal composition of the present invention can include a component (C), that is different from the component (A) or component (B). The content of the component (C) in the liquid crystal composition is not particularly limited, but it is preferably to be 20% or less, and more preferably 1-10%, and yet more preferably 1-6%.

The component (C) can include a compound having a positive dielectric anisotropy, that is, having a dielectric anisotropy of +2 or more, and for example, a compound represented by formula (c1) can be exemplified.

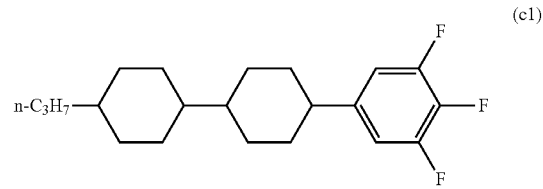

(c1)

The content of the compound represented by formula (c1) in the liquid crystal composition is preferably 1-20%, and more preferably 2-10%, and yet more preferably 3-7%.

In addition to the compound explained above, the liquid crystal composition of the present invention can include general nematic liquid crystal, smectic liquid crystal, cholesteric liquid crystal, antioxidant, UV absorber, polymerizable monomer, depending on the application thereof.

The polymerizable monomer can preferably include difunctional monomer represented by formula (VI) below.

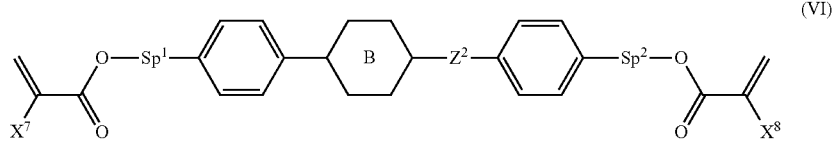

In the formula, each of $X^7$ and $X^8$ independently represents hydrogen atom or methyl group;

each of $Sp^1$ and $Sp^2$ independently represents a single bond, alkylene group having a carbon atom number of 1-8, or —O—$(CH_2)_s$—

(In the formula, s represents an integer of 2 to 7, and oxygen atom shall bind to the aromatic ring);

$Z^2$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—OCO—, —CH$_2$CH$_2$—OCO—, —COO—CH$_2$—, —OCO—CH$_2$—, —CH$_2$—OCO—, —CH$_2$—OCO—, —CY$^1$=CY$^2$— (in the formula, each of $Y^1$ and $Y^2$ independently represents fluorine atom or hydrogen atom.) and —C≡C— or a single bond;

B represents 1,4-phenylene group, trans-1,4-cyclohexylene group or a single bond. As to all the 1,4-phenylene group in the formula, an arbitrary hydrogen atom may be substituted with fluorine atom.

Both of $X^7$ and $X^8$ can be preferably either of hydrogen atom to become a diacrylate derivative or methyl group to become a dimethacrylate derivative. Alternatively, it is also preferable that one can be hydrogen atom, and the other can be methyl group. As to the polymerization rate of these compounds, the diacrylate derivative is the fastest, the dimethacrylate derivative is slower, and an asymmetry compound is middling, and a preferable embodiment can be used depending on the use. For the application of a PSA display element, a dimethacrylate derivative is particularly preferable.

Each of $Sp^1$ and $Sp^2$ independently represents single bond, alkylene group having a carbon atom number of 1-8, or —O—$(CH_2)_s$—. For a PSA display element, it is preferable that at least one of them is single bond. The preferable embodiment includes a compound in which both are single bonds, or the one is single bond and the other is alkylene group having a carbon atom number of 1-8 or —O—$(CH_2)_s$—. In this case, 1-4 alkyl group is preferable, and, s is preferably 1-4.

$Z^2$ preferably represents —OCH$_2$—, —CH$_2$O—, —COO—, —OCO—, —CF$_2$O—, —OCF$_2$—, —CH$_2$CH$_2$—, —CF$_2$CF$_2$— or a single bond, and more preferably —COO—, —OCO— or a single bond, and in particular, a single bond is preferable.

B represents 1,4-phenylene group, trans-1,4-cyclohexylene group or a single bond, in which any hydrogen atom may be substituted with fluorine atom. In particular, 1,4-phenylene group or a single bond is preferable. When B represents a ring structure other than single bond, $Z^2$ preferably represents a connection group except for a single bond. When B is a single bond, $Z^2$ is preferably a single bond.

From these points, in formula (VI), the ring structure between $Sp^1$ and $Sp^2$ can be specifically the structure listed next.

When B expresses a single bond in formula (VI), and a ring structure is formed with two rings, it is preferable to be represented by formula (VIa-1) to formula (VIa-5) as follows, and it is more preferable to be represented by formula (VIa-1) to formula (VIa-3), and it is particularly preferable to be represented by formula (VIa-1).

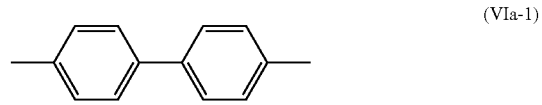

(VIa-1)

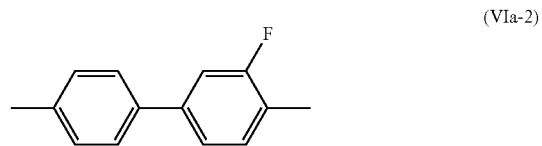

(VIa-2)

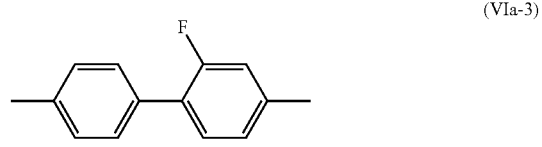

(VIa-3)

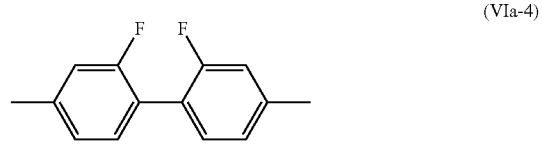

(VIa-4)

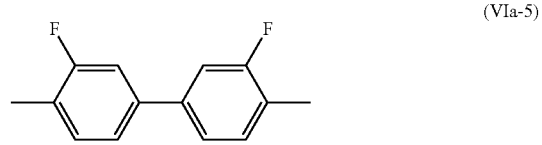

(VIa-5)

In the formula, the both ends shall bind to $Sp^1$ or $Sp^2$.

The polymerizable compound including the frames can be provided with, after the polymerization, an orientation control ability suitable for PSA type liquid crystal display elements, thereby producing good orientation state. Thus, the indication irregularity can be restrained or even does not occur at all.

In view of the above, the polymerizable monomer can be preferably formula (VI-1) to (VI-4), and most preferably formula (VI-2).

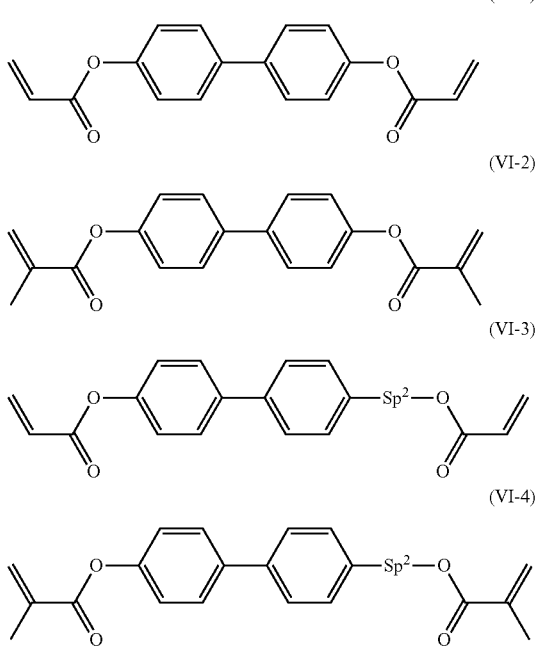

In the formula, Sp2 represents an alkylene group having a carbon atom number of 2 to 5.

When a difunctional monomer represented by formula (VI) is used as the polymerizable monomer, the content of the difunctional monomer in the liquid crystal composition is preferably 2% or less, and more preferably 1.5% or less, and yet more preferably 1% or less, and particularly preferably 0.5% or less, and most preferably 0.4% or less. When it is included at 2% or less, the outbreak of the drop traces can be reduced.

When a monomer is added in the liquid crystal composition of the present invention, the polymerization can progress even in the absence of a polymerization initiator, but can include a polymerization initiator to promote the polymerization. The polymerization initiator can include benzoin ethers, benzophenones, acetophenones, benzyl ketals, and acyl phosphine oxides. In addition, a stabilizer can be added in order to improve the preservation stability. The stabilizer useful can include, for example, hydroquinones, hydroquinone monoalkylethers, tert-butylcatechols, pyrogallols, thiophenols, nitro compounds, β-naphthylamines, β-naphthols, and nitroso compounds.

The liquid crystal composition including the polymerizable compound of the present invention is useful for liquid crystal display elements, in particular for liquid crystal display elements for active matrix drive, and can be used for liquid crystal display elements for PSA mode, PSVA mode, VA mode, IPS mode or ECB mode.

The liquid crystal composition including a polymerizable compound of the present invention can be given a liquid crystalline orientation ability by polymerizing the polymerizable compound included therein through ultraviolet irradiation, and can control the light transmission volume by means of the birefringence of the liquid crystal composition so as to be used as a liquid crystal display element. As such a liquid crystal display element, the examples useful can include AM-LCD (active matrix liquid crystal display element), TN (nematic liquid crystal display element), STN-LCD (super twisted nematic liquid crystal display element), OCB-LCD and IPS-LCD (in-plane switching liquid crystal display element). In particular, it is useful for AM-LCD, and can be used as a transmission type or reflection type liquid crystal display element.

Two substrates of liquid crystalline cell used for the liquid crystal display element can a flexible and transparent material such as glass or resin, and one of them can be an opaque material such as silicon. For example, a transparent substrate having a transparent electrode layer can be obtained by sputtering indium tin oxide (ITO) on a transparent substrate such as a glass plate.

The substrates are opposed to each other such that the transparent electrode layers are located inside. At that time, the distance of the substrates can be regulated by a spacer therebetween. Here, it is preferable to adjust the color adjustment layer having a thickness of 1-100 μm. It is further preferable to be 1.5 to 10 μm. When a polarizing plate is used, it is preferable to adjust the product of the refractive index anisotropy Δn and the cell thickness d of the liquid crystal in order to maximize the contrast. In addition, in case of two polarizing plates, the polarization axis of each polarizing plate can be adjusted in order to make the view angle and contrast good. Furthermore, a phase difference film can be used in order to widen the view angle. For example, the spacer can include glass particle, resin particle, alumina particle, and photoresist material. Thereafter, the sealant such as epoxy type thermosetting composition is screen-printed on the substrate such that an injection hole for liquid crystal is provided, and the substrates are attached to each other, which are then heated to thermally cure the sealant.

The liquid crystal composition including the polymerizable compound can be intervened between two substrates by means of normal vacuum injection method and ODF method. However, there is a problem in the vacuum injection method since a trace due to the injection can be left while a drop trace does not occur. The present invention is more suitable for the display element which is manufactured by means of the ODF method.

As a method to polymerize the polymerizable compound, appropriate polymerization rate is desirably obtained in order to accomplish good orientation performance of the liquid crystal. In detail, it is preferably to use active energy lines such as ultraviolet lines and electron lines alone, or a combination thereof, or to irradiate several kinds of active energy lines in turn. When using ultraviolet lines, a polarization light source can be used, or an unpolarized light source can be used. When the liquid crystal composition including a polymerizable compound is polymerized in a state that it is placed between the two substrates, at least one of the substrates located at the side of the irradiation surface shall be suitably transparent to the active energy lines. Also, after having polymerized only a specific moiety by using a mask at the time of light irradiation, the condition such as electric field, magnetic field or temperature can be changed such that the orientation state of the non-polymerized portion is changed, and then, polymerization can be performed by further irradiating the active energy lines. In particular, when ultraviolet rays are exposed, the liquid crystal composition including a polymerizable compound is preferably applied with alternative electric field while exposed to ultraviolet lines. The alternative electric field to be applied is preferably alternative current with a frequency of 10 Hz to 10 kHz, and more preferably 60 Hz to 10 kHz. The voltage is selected depending on the desired pretilt angle of the liquid crystal display element. In other words, the pretilt angle of the liquid crystal display element can be controlled by the voltage to be applied. In the liquid crystal display element of the MVA mode, the pretilt angle can be preferably controlled at 80° to 89.9° in view of the orientation stability and contrast.

The temperature at the time of the irradiation is preferably within the temperature range where the liquid crystalline state of the liquid crystal composition of the present invention can be maintained. It is preferable to typically polymerize at a temperature that is close to the room temperature, namely a temperature of 15-35° C. The lamp generating the ultraviolet lines to be used can include metal halide lamp, high pressure mercury lamp, and super-high pressure mercury lamp. Also, with respect to the wavelength of the ultraviolet lines to be irradiated, it is preferable to irradiate ultraviolet lights having a wavelength range that does not overlap with the absorption wavelength band of the liquid crystal composition. If necessary, the ultraviolet lines are trimmed to be used. The strength of the ultraviolet lines to be irradiated is preferably 0.1 mW/cm2 to 100 W/cm2, and more preferably 2 mW/cm2 to 50 W/cm2. The energy amount of the ultraviolet lines to be irradiated can be appropriately adjusted, and it is preferably 10 mJ/cm2 to 500 J/cm2, more preferably 100 mJ/cm2 to 200 J/cm2. When irradiating ultraviolet lines, the strength can be changed. The period to irradiate ultraviolet lines can be appropriately adjusted depending on the strength of the ultraviolet lines to be irradiated, and it is preferably 10 to 3,600 seconds, and more preferably 10 to 600 seconds.

<<Liquid Crystal Display Element>>

The structure of the liquid crystal display element of the second embodiment of the present invention can preferably include: as shown in FIG. 1, a first substrate having a common electrode made of a transparent conductive material; a second substrate having a pixel electrode made of a transparent conductive material, and a thin film transistor to control a pixel electrode for each pixel; and a liquid crystal composition held between the first substrate and the second substrate. As the liquid crystal composition above, used is the liquid crystal composition of the first embodiment of the present invention. In the liquid crystal display element above, the orientation of the liquid crystal molecules when voltage is not applied is approximately perpendicular to the substrates.

As explained before, the outbreak of the drop trace is significantly affected by the kinds and the combination of the liquid crystal compounds constituting the liquid crystal material (liquid crystal composition) to be injected. Furthermore, the kinds and the combination of the materials constituting the display element can also affect on the outbreak of the drop trace. In particular, the material separating the color filter and the thin film transistor formed in the liquid crystal display element is only of a thin material such as an oriented film or transparent electrode. Therefore, such a color filter and thin film transistor can likely affect the liquid crystal composition to thereby produce drop traces.

In particular, when the thin film transistor in the liquid crystal display element is an inverted staggered type, its drain electrode is formed to cover the gate electrode, so that the area of the thin film transistor tends to be increased. The drain electrode is formed from metallic material such as copper, aluminum, chromium, titanium, molybdenum, and tantalum, and generally, a passivation treatment is applied in usually embodiments. However, the protection film is thin and the oriented film is thin such that it is more likely not to block ionic substances. Therefore, when conventional liquid crystal composition is used, there is often outbreak of the drop traces due to the interaction between the metallic material and the liquid crystal composition.

On the other hand, as shown by the results of the drop trace evaluation in the Examples below, when using the liquid crystal composition of the first embodiment of the present invention, the outbreak of the drop traces that is the conventional problem can be sufficiently reduced, though its mechanism in detail has been unexplained.

Figure 2:
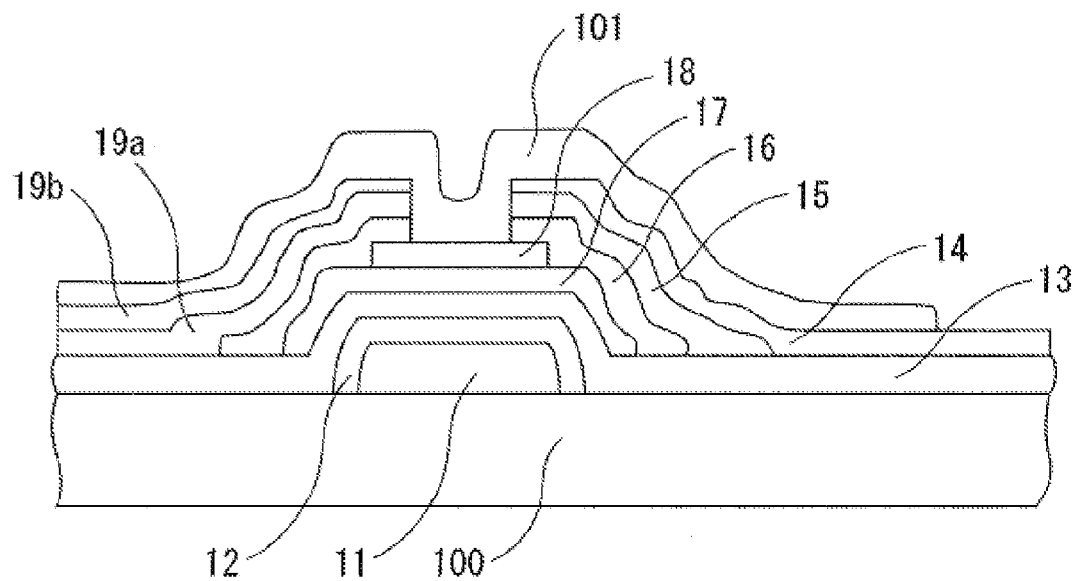
FIG. 2 is a cross section drawing showing an example of the construction of an inverted staggered type thin film transistor.

The liquid crystal composition of the first embodiment of the present invention is, as shown in FIG. 2, suitable for the liquid crystal display element in which the thin film transistor is an inverted staggered type. In this case, it is preferable to use aluminum wirings.

The liquid crystal display element using the liquid crystal composition of the first embodiment of the present invention is useful in accomplishing both the high speed response and the restraint of the display defectiveness. It is particularly useful for active matrix drive, and applicable to liquid crystal display elements for VA mode, PSVA mode, PSA mode, IPS mode, or ECB modes.

The liquid crystal display of the present invention is one applying the liquid crystal display element of the present invention to a display (display unit) by a well-known method.

EXAMPLES

Hereinafter, the present invention is explained more in detail with reference to the Examples, but the construction of the present invention should not be limited to the Examples alone. The indication of "%" in the examples and comparative examples below means "mass %."

In the Examples, the characteristics that were measured are as follows.

$T_{ni}$: nematic phase—isotropic liquid phase transition temperature (° C.);

$\Delta n$: Refractive index anisotropy at 25° C.;

$\Delta \in$: Dielectric anisotropy at 25° C.;

$\eta$: Viscosity at 20° C. (mPa·s);

$\gamma_1$: Rotational viscosity at 25° C. (mPa·s);

Initial voltage holding rate (Initial VHR): Voltage holding rate (%) at 60° C. under a condition at a frequency of 60 Hz and an applied voltage of 1V; and Voltage holding rate after one hour at 150° C.: Voltage holding rate (%) which was measured in the same condition as the initial VHR after having maintained it at an atmosphere of 150° C. for one hour.

<Evaluation of the Ghosting>

The evaluation of the ghosting of the liquid crystal display element was made as follows. A predetermined fixed pattern was displayed inside the display area for 1,000 hours, and then, a uniform displaying at full screen was performed to check the level of the afterimage of the fixed pattern by visual observation to evaluate it by four grades.

A: No afterimage.
B: Acceptable level though there were a few afterimages
C: Unacceptable level due to the afterimages
D: Very inferior due to the existence of the afterimages <Evaluation of the Drop Traces>

The evaluation of the drop traces of the liquid crystal display device was made as follows. A black displaying at full screen was performed to evaluate the drop traces, i.e., white traces rising thereon, by visual observation at four grades below.

A: No afterimage.
B: Acceptable level though there were a few afterimages
C: Unacceptable level due to the afterimages
D: Very inferior due to the existence of the afterimages <Evaluation of the Process Compatibility>

The process compatibility was evaluated as follows. In the ODF process, a constant volume metering pump was used. 50 pL of the liquid crystal was dropped per one time, and this step was repeated 100,000 times. For each 100 times (i.e., 0-100 times, 101-200 times, 201-300 times, . . . 99901-100,000 times), the change of the amount of the liquid crystal was evaluated by following four grades.

A: The change was extremely small (the liquid crystal display element can be produced stably).
B: Acceptable level though there were slight changes.
C: Unacceptable Level due to the changes (the yield was worsened by spot outbreak).
D: Considerably inferior because of the changes (i.e., the leak of the liquid crystal or vacuum air void was generated).

<Evaluation of the Low Temperature Solubility>

The evaluation of the low temperature solubility was made as follows. After preparation of a liquid crystal composition, 1 g of the liquid crystal composition was weighted in a sample pot of 2 mL, which was put in a test bath with temperature control, and applied to one cycle of the temperature changes as follows: "−20° C. (kept for one hour)->raising the temperature (0.1° C./minute)->0° C. (kept for one hour)->raising the temperature (0.1° C./minute)->20° C. (kept for one hour)->decreasing the temperature (−0.1° C./minute)->0° C. (kept for one hour)->decreasing the temperature (−0.1° C./minute)->−20° C." During the cycle, the generation of the deposit from the liquid crystal composition was visually observed by the four grades below.

A: No deposits were observed for 600 hours or more.
B: No deposits were observed for 300 hours or more.
C: Deposits were observed within 150 hours.
D: Deposits were observed within 75 hours.

Example 1 and Comparative Example 1

The liquid crystal compositions as shown in Table 1 were prepared, and then, their physical properties were measured.

In addition, using each liquid crystal composition of Example 1 and Comparative Example 1, a VA liquid crystal display element as shown in FIG. 1 was produced, respectively. The liquid crystal display element above has a thin film transistor of an inverted staggered type as an active element. The injection of the liquid crystal composition was carried out by means of a dropping method (the ODF method). Furthermore, in the same manner as the methods already explained, the display element as obtained was measured to evaluate the ghosting, the drop trace, the process compatibility and the low temperature solubility. The results are shown in Table 1.

TABLE 1

| formula | ratio (%) | |
|---|---|---|
| | Example 1 | Comp. Ex. 1 |
| Formula (4.2) | 7 | 7 |
| Formula (4.3) | 6 | 6 |
| Formula (b2) | | 21 |
| Formula (1.1) | 21 | |
| Formula (a2) | 2 | 2 |
| Formula (3.1) | 19 | 19 |
| Formula (3.2) | 6 | 6 |
| Formula (2.1) | 13 | 13 |
| Formula (2.2) | 4 | 4 |
| Formula (6.1) | 17 | 17 |
| Formula (6.3) | 5 | 5 |
| $T_{NI}/°$ C. | 75.4 | 73.3 |
| $\Delta n$ | 0.0890 | 0.0866 |
| $\Delta\epsilon$ | −3.00 | −2.67 |
| $\eta$/mPa · s | 18.4 | 17.3 |
| $\gamma_1$/mPa · s | 106 | 98 |
| Initial voltage holding rate (%) | 99.4 | 99.3 |
| Voltage holding rate after one hour at 150° C. (%) | 98.9 | 97.5 |

TABLE 1-continued

| formula | ratio (%) | |
|---|---|---|
| | Example 1 | Comp. Ex. 1 |
| Evaluation of the ghosting | A | D |
| Evaluation of the drip traces | A | C |
| Evaluation of the process compatibility | A | A |
| Evaluation of the low temperature solubility | B | C |

In Table 1, the compound represented by chemical formula (b2) in Comparative Example 1 is a compound having a structural formula represented by formula (b2).

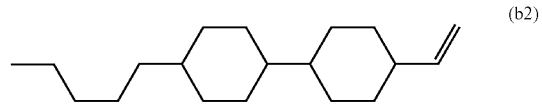

(b2)

The liquid crystal composition of Example 1 was found practical as a liquid crystal composition for TV application, as having a liquid crystal phase temperature range of 75.4° C., a large absolute value of dielectric anisotropy, low rotational viscosity and most suitable Δn value. In addition, the low temperature solubility was good, as well. Furthermore, the VA liquid crystal display element having the structure as shown in FIG. 1, which was produced by using the liquid crystal composition of Example 1, showed significantly excellent results in the evaluations of the ghosting, the drop traces and the process compatibility. The VA liquid crystal display element was superior in the initial voltage holding rate and the voltage holding rate after one hour at 150° C.

Example 2 and Comparative Example 2

The liquid crystal compositions as shown in Table 2 were prepared, and then, their physical properties were measured.

In addition, a display element was produced in the same manner as Example 1 except for using the liquid crystal composition of Example 2 and Comparative Example 2, respectively, which was then measured to evaluate the ghosting, the drop trace, the process compatibility and the low temperature solubility. The results are shown in Table 2.

TABLE 2

| formula | ratio (%) | |
|---|---|---|
| | Example 2 | Comp. Ex. 2 |
| Formula (4.2) | 11 | 11 |
| Formula (4.3) | 9 | 9 |
| Formula (1.2) | 6 | 6 |
| Formula (4.4) | 9 | 9 |
| Formula (9.7) | 9 | 9 |
| Formula (5.1) | 13 | 13 |
| Formula (5.3) | 4 | 4 |
| Formula (8.8) | 11 | 11 |
| Formula (2.2) | 9 | |
| Formula (a1) | | 9 |
| Formula (3.1) | 4 | 4 |
| Formula (3.2) | 9 | 9 |
| Formula (7.2) | 6 | 6 |
| $T_{NI}/°$ C. | 74.6 | 75.2 |
| $\Delta n$ | 0.0920 | 0.0923 |
| $\Delta\epsilon$ | −3.10 | −3.07 |
| $\eta$/mPa · s | 19.4 | 19.0 |
| $\gamma_1$/mPa · s | 114 | 119 |
| Initial voltage holding rate (%) | 99.3 | 99.2 |

TABLE 2-continued

| formula | ratio (%) | |
| --- | --- | --- |
| | Example 2 | Comp. Ex. 2 |
| Voltage holding rate after one hour at 150° C. (%) | 98.7 | 98.5 |
| Evaluation of the ghosting | A | A |
| Evaluation of the drip traces | A | B |
| Evaluation of the process compatibility | A | C |
| Evaluation of the low temperature solubility | A | D |

The liquid crystal composition of Example 2 was found practical as a liquid crystal composition for TV application, as having a liquid crystal phase temperature range of 74.6° C., a large absolute value of dielectric anisotropy, low rotational viscosity and most suitable Δn value. In addition, the low temperature solubility was good, as well. Furthermore, the VA liquid crystal display element having the structure as shown in FIG. 2, which was produced by using the liquid crystal composition of Example 1, showed significantly excellent results in the evaluations of the ghosting, the drop traces and the process compatibility. The VA liquid crystal display element was superior in the initial voltage holding rate and the voltage holding rate after one hour at 150° C.

Examples 3 to 6

The liquid crystal compositions as shown in Table 3 were prepared, and then, their physical properties were measured.

In addition, a display element was produced in the same manner as Example 1 except for using the liquid crystal composition of Examples 3 to 6, respectively, which was then measured to evaluate the ghosting, the drop trace, the process compatibility and the low temperature solubility. The results are shown in Table 3.

TABLE 3

| formula | Ratio (%) | | | |
| --- | --- | --- | --- | --- |
| | Ex. 3 | Ex. 4 | Ex. 5 | Ex. 6 |
| Formula (4.4) | 6 | 6 | 6 | 6 |
| Formula (1.1) | 12 | 12 | 12 | 12 |
| Formula (4.2) | 15 | 15 | 15 | 8 |
| Formula (8.1) | 11 | 11 | 11 | 11 |
| Formula (8.5) | 11 | 11 | 11 | 11 |
| Formula (8.8) | 6 | 6 | | 10 |
| Formula (2.1) | 3 | 3 | 3 | 3 |
| Formula (2.2) | | | 6 | 6 |
| Formula (6.1) | 21 | 21 | 14 | 11 |
| Formula (7.1) | 12 | | 12 | 12 |
| Formula (7.2) | 3 | 3 | 3 | 3 |
| Formula (3.1) | | 6 | 7 | 7 |
| Formula (3.2) | | 6 | | |
| $T_{NI}$/° C. | 76.5 | 81.3 | 87.7 | 97.9 |
| Δn | 0.096 | 0.088 | 0.103 | 0.109 |
| Δ∈ | −2.61 | −3.14 | −2.59 | −3.07 |
| η/mPa · s | 14 | 16 | 17 | 21 |
| $\gamma_1$/mPa · s | 79 | 93 | 99 | 115 |
| Initial voltage holding rate (%) | 99.7 | 99.1 | 99.5 | 99.2 |
| Voltage holding rate after one hour at 150° C. (%) | 99.0 | 98.1 | 98.2 | 98.3 |
| Evaluation of the ghosting | A | A | A | A |
| Evaluation of the drip traces | A | A | B | A |
| Evaluation of the process compatibility | A | B | A | B |
| Evaluation of the low temperature solubility | A | B | A | A |

The liquid crystal compositions of Examples 3 to 6 were found practical as a liquid crystal composition for TV application, as having a liquid crystal phase temperature range of 76.5 to 97.9° C., and being excellent in the refractive index anisotropy and the dielectric anisotropy, as well. The liquid crystal compositions of Examples 3, 5 and 6 were significantly superior in the evaluation of the low temperature solubility.

The VA liquid crystal display element of Example 3 was significantly excellent in the evaluations of the ghosting, the drop traces and the process compatibility. The VA liquid crystal display element of Example 4 was significantly excellent in the evaluations of the ghosting and the drop traces. The VA liquid crystal display element of Example 5 was significantly excellent in the evaluations of the ghosting and the process compatibility. The VA liquid crystal display element of Example 6 was significantly excellent in the evaluations of the ghosting and the drop traces.

The VA liquid crystal display elements of Examples 3 to 6 were superior in the initial voltage holding rate and the voltage holding rate after one hour at 150° C.

Examples 7 to 10

The liquid crystal compositions as shown in Table 4 were prepared, and then, their physical properties were measured.

In addition, a display element was produced in the same manner as Example 1 except for using the liquid crystal composition of Examples 7 to 10, respectively, which was then measured to evaluate the ghosting, the drop trace, the process compatibility and the low temperature solubility. The results are shown in Table 4.

TABLE 4

| formula | Ratio (%) | | | |
| --- | --- | --- | --- | --- |
| | Ex. 7 | Ex. 8 | Ex. 9 | Ex. 10 |
| Formula (4.2) | 7 | 7 | | |
| Formula (4.3) | 6 | 6 | | |
| Formula (1.1) | 21 | | 13 | 14 |
| Formula (1.2) | | 21 | 21 | 7 |
| Formula (b1) | | | | 13 |
| Formula (6.1) | 17 | 17 | 5 | 17 |
| Formula (6.3) | 5 | 5 | 17 | 5 |
| Formula (2.1) | 13 | 13 | 10 | 13 |
| Formula (2.2) | 4 | 4 | 7 | 4 |
| Formula (3.1) | 19 | 19 | 10 | 19 |
| Formula (3.2) | 6 | 6 | 15 | 6 |
| Formula (a2) | 2 | 2 | 2 | 2 |
| $T_{NI}$/° C. | 77.3 | 73.9 | 71.7 | 76.7 |
| Δn | 0.094 | 0.093 | 0.092 | 0.097 |
| Δ∈ | −3.89 | −3.88 | −3.87 | −4.06 |
| η/mPa · s | 32.7 | 29.9 | 31.7 | 30.1 |
| $\gamma_1$/mPa · s | 204 | 190 | 215 | 191 |
| Initial voltage holding rate (%) | 99.7 | 99.7 | 99.3 | 99.2 |
| Voltage holding rate after one hour at 150° C. (%) | 99.0 | 98.0 | 98.8 | 98.3 |
| Evaluation of the ghosting | A | B | A | B |
| Evaluation of the drip traces | A | A | A | B |
| Evaluation of the process compatibility | A | B | B | A |
| Evaluation of the low temperature solubility | A | A | B | A |

The liquid crystal compositions of Examples 7 to 10 were found practical as a liquid crystal composition for TV application, as having a liquid crystal phase temperature range of 71.7 to 77.3° C., and being excellent in the refractive index anisotropy and the dielectric anisotropy, as well. The liquid crystal compositions of Examples 7, 8 and 10 were significantly superior in the evaluation of the low temperature solubility.

The VA liquid crystal display element of Example 7 was significantly excellent in the evaluations of the ghosting, the drop traces and the process compatibility. The VA liquid crystal display element of Example 8 was significantly excellent in the evaluation of the drop traces. The VA liquid crystal display element of Example 9 was significantly excellent in the evaluations of the ghosting and the drop traces. The VA liquid crystal display element of Example 10 was significantly excellent in the evaluations of the ghosting and the process compatibility.

The VA liquid crystal display elements of Examples 7 to 10 were superior in the initial voltage holding rate and the voltage holding rate after one hour at 150° C.

Examples 11 to 14

The liquid crystal compositions as shown in Table 5 were prepared, and then, their physical properties were measured.

In addition, a display element was produced in the same manner as Example 1 except for using the liquid crystal composition of Examples 11 to 14, respectively, which was then measured to evaluate the ghosting, the drop trace, the process compatibility and the low temperature solubility. The results are shown in Table 5.

TABLE 5

| formula | Ratio (%) | | | |
|---|---|---|---|---|
| | Ex. 11 | Ex. 12 | Ex. 13 | Ex. 14 |
| Formula (4.0) | 23 | 10 | 23 | 25 |
| Formula (4.2) | 3 | 3 | 3 | |
| Formula (1.2) | 2 | 2 | 2 | |
| Formula (1.1) | | 13 | | 2 |
| Formula (9.6) | 3 | 3 | 3 | 3 |
| Formula (5.1) | 13 | 13 | 13 | 13 |
| Formula (5.3) | 7 | 7 | 7 | 7 |
| Formula (8.8) | 11 | 11 | | 11 |
| Formula (2.1) | | | 11 | 5 |
| Formula (2.2) | 6 | 6 | 6 | 6 |
| Formula (3.1) | 11 | 11 | 11 | 10 |
| Formula (3.2) | 13 | 13 | 13 | 10 |
| Formula (7.1) | 8 | 8 | 8 | 4 |
| Formula (7.2) | | | | 4 |
| $T_{NI}$/° C. | 79.4 | 78.9 | 79.9 | 79.2 |
| $\Delta n$ | 0.107 | 0.108 | 0.107 | 0.104 |
| $\Delta\epsilon$ | −3.80 | −3.99 | −3.77 | −3.84 |
| $\eta$/mPa·s | 23.4 | 28.5 | 24.0 | 24.2 |
| $\gamma_1$/mPa·s | 147 | 173 | 153 | 150 |
| Initial voltage holding rate (%) | 99.7 | 99.7 | 99.3 | 99.2 |
| Voltage holding rate after one hour at 150° C. (%) | 99.0 | 99.0 | 98.8 | 98.3 |
| Evaluation of the ghosting | A | B | A | A |
| Evaluation of the drip traces | A | A | B | A |
| Evaluation of the process compatibility | A | A | A | B |
| Evaluation of the low temperature solubility | A | A | A | A |

The liquid crystal compositions of Examples 11 to 14 were found practical as a liquid crystal composition for TV application, as having a liquid crystal phase temperature range of 78.9 to 79.9° C., and being excellent in the refractive index anisotropy and the dielectric anisotropy, as well. The liquid crystal compositions of Examples 3, 11 and 14 were significantly superior in the evaluation of the low temperature solubility.

The VA liquid crystal display element of Example 11 was significantly excellent in the evaluations of the ghosting, the drop traces and the process compatibility. The VA liquid crystal display element of Example 12 was significantly excellent in the evaluations of the drop traces and the process compatibility. The VA liquid crystal display element of Example 13 was significantly excellent in the evaluations of the ghosting and the process compatibility. The VA liquid crystal display element of Example 14 was significantly excellent in the evaluations of the ghosting and the drop traces.

The VA liquid crystal display elements of Examples 11 to 14 were superior in the initial voltage holding rate and the voltage holding rate after one hour at 150° C.

Examples 15 to 18

The liquid crystal compositions as shown in Table 6 were prepared, and then, their physical properties were measured.

In addition, a display element was produced in the same manner as Example 1 except for using the liquid crystal composition of Examples 15 to 18, respectively, which was then measured to evaluate the ghosting, the drop trace, the process compatibility and the low temperature solubility. The results are shown in Table 6.

TABLE 6

| formula | Ratio (%) | | | |
|---|---|---|---|---|
| | Ex. 15 | Ex. 16 | Ex. 17 | Ex. 18 |
| Formula (1.2) | 6 | | 6 | |
| Formula (4.4) | 9 | 9 | 9 | 9 |
| Formula (1.1) | | 6 | | 6 |
| Formula (b1) | | | 9 | 11 |
| Formula (4.0) | | 6 | | |
| Formula (4.2) | 11 | 5 | 11 | |
| Formula (4.3) | 9 | 9 | | 9 |
| Formula (9.7) | 9 | 9 | 9 | 9 |
| Formula (5.1) | 13 | 13 | 13 | 7 |
| Formula (5.3) | 4 | 4 | | 4 |
| Formula (6.3) | | | 4 | 6 |
| Formula (8.8) | 11 | | 5 | 8 |
| Formula (2.1) | | | 6 | 3 |
| Formula (2.2) | 9 | 9 | 9 | 9 |
| Formula (a1) | | 11 | | |
| Formula (3.1) | 4 | 4 | 4 | 4 |
| Formula (3.2) | 9 | 9 | 9 | 9 |
| Formula (7.2) | 6 | 6 | 6 | 6 |
| $T_{NI}$/° C. | 74.4 | 75.4 | 74.4 | 77.1 |
| $\Delta n$ | 0.094 | 0.093 | 0.095 | 0.097 |
| $\Delta\epsilon$ | −2.94 | −2.82 | −3.03 | −2.91 |
| $\eta$/mPa·s | 24.5 | 24.4 | 23.4 | 25.4 |
| $\gamma_1$/mPa·s | 156 | 159 | 155 | 173 |
| Initial voltage holding rate (%) | 99.7 | 99.7 | 99.3 | 99.2 |
| Voltage holding rate after one hour at 150° C. (%) | 99.0 | 99.0 | 98.8 | 98.3 |
| Evaluation of the ghosting | A | A | A | B |
| Evaluation of the drip traces | A | A | B | A |
| Evaluation of the process compatibility | A | B | A | A |
| Evaluation of the low temperature solubility | A | A | A | A |

The liquid crystal compositions of Examples 15 to 18 were found practical as a liquid crystal composition for TV application, as having a liquid crystal phase temperature range of 74.4 to 77.1° C., and being excellent in the refractive index anisotropy and the dielectric anisotropy, as well. The liquid crystal compositions of Examples 3, 15 and 18 were significantly superior in the evaluation of the low temperature solubility.

The VA liquid crystal display element of Example 15 was significantly excellent in the evaluations of the ghosting, the drop traces and the process compatibility. The VA liquid crystal display element of Example 16 was significantly excellent in the evaluations of the ghosting and the drop traces. The VA liquid crystal display element of Example 17 was significantly excellent in the evaluations of the ghosting and the process compatibility. The VA liquid crystal display element of Example 18 was significantly excellent in the evaluations of the drop traces and the process compatibility.

The VA liquid crystal display elements of Examples 15 to 18 were superior in the initial voltage holding rate and the voltage holding rate after one hour at 150° C.

Each construction of each embodiment as explained above, or its combination is an example. Without deviating from the gist of the present invention, addition of the constitution, abbreviation, replacement, or other changes are possible. Also, the present invention is not limited by each embodiment, and is defined only by the scope of the claims.

INDUSTRIAL UTILITY

The liquid crystal composition of the present invention can be widely applicable to the fields of liquid crystal display elements and liquid crystal displays.

EXPLANATION OF THE REFERENCES IN THE DRAWINGS

1: polarizing plate; 2: substrate; 3: transparent electrode or transparent electrode with active element; 4: oriented film; 5: liquid crystal; 11: gate electrodes; 12: positive electrode oxidation coating; 13: gate insulating layers; 14: transparent electrode; 15: drain electrode; 16: ohmic contact layer; 17: semiconductor layer; 18: protection film; 19*a*: source electrode 1; 19*b*: source electrode 2; 100: substrate; and 101: protective layer.

What is claimed is:

1. A liquid crystal composition having a negative dielectric anisotropy, comprising:
   a component (A) that is dielectrically negative, having a dielectric anisotropy of −2 or less;
   a component (B) that is dielectrically neutral, having a dielectric anisotropy of more than −2 and less than +2; and
   a component (C) that is different from the component (A) and the component (B),
   the component (B) including 2 to 25% of a compound represented by formula (1.1); and

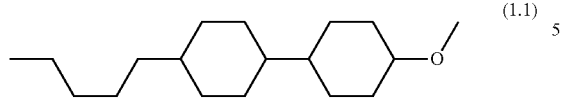
(1.1)

the component (A) including a compound represented by formula (2.1); 1 to 20% of a compound represented by formula (2.2); and 8 to 24% of a compound represented by formula (5) or formula (6):

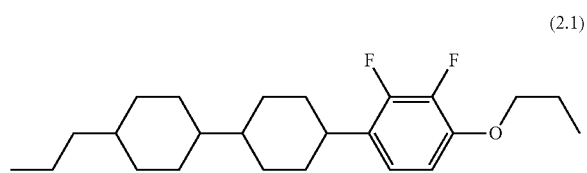
(2.1)

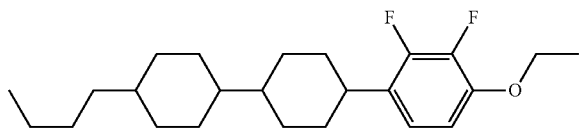
(2.2)

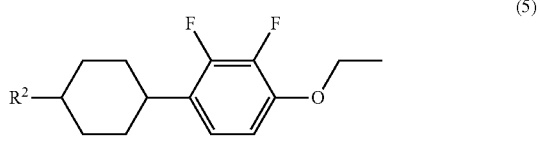
(5)

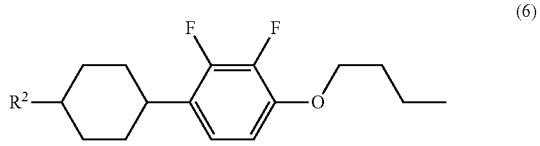
(6)

wherein in the formula (5) and the formula (6), $R^2$ represents an alkyl group having a carbon number of 3 to 5,
wherein a content of the component (C) is 1 to 10%, and a total content of the component (A) and the component (B) is 90 to 99%.

2. The liquid crystal composition according to claim 1, wherein the component (B) further includes a compound represented by formula (1.2):

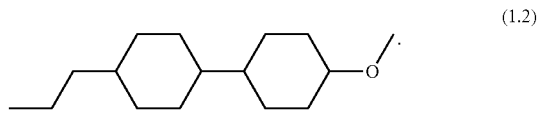
(1.2)

3. The liquid crystal composition according to claim 1, wherein the component (A) further includes at least one compound represented by formula (3.1) or formula (3.2):

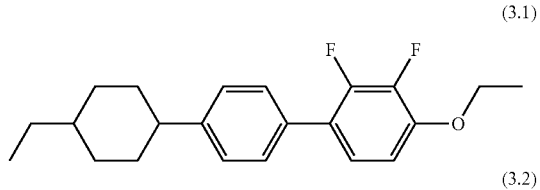
(3.1)

(3.2)

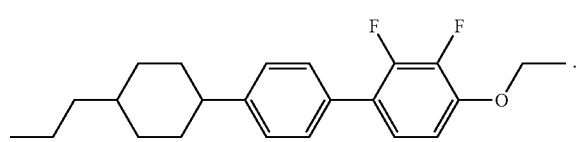

4. The liquid crystal composition according to claim 3, wherein a content of the compound represented by formula (3.1) is 15 mass % or more with respect to a total amount of the liquid crystal composition.

5. The liquid crystal composition according to claim 1, wherein a content of the compound represented by formula (1.1) is 7 mass % or more with respect to a total amount of the liquid crystal composition.

6. The liquid crystal composition according to claim 1, wherein the component (B) further includes a compound represented by formula (4):

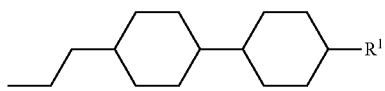
(4)

where R1 represents an alkyl group having a carbon number of 2 to 5 or an alkoxy group having a carbon number of 3 to 5.

7. The liquid crystal composition according to claim 1, wherein the component (A) further includes a compound represented by formula (7):

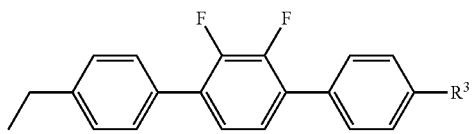
(7)

where R3 represents an alkyl group having a carbon number of 3 or 4.

8. The liquid crystal composition according to claim 1, wherein the component (A) further includes a compound represented by formula (8):

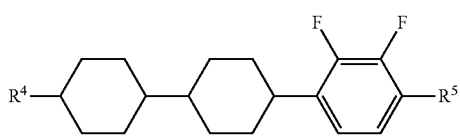
(8)

where $R^4$ represents an alkyl group having a carbon number of 2 or 3; $R^5$ represents an alkyl group having a carbon number of 1 or 2, or an alkoxy group having a carbon number of 1 or 2.

9. The liquid crystal composition according to claim 1, wherein the component (B) further includes a compound represented by formula (9):

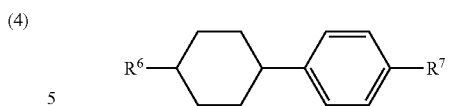
(9)

where $R^6$ represents an alkyl group having a carbon number of 3 or 5; $R^7$ represents an alkyl group having a carbon number of 1 to 3, or an alkoxy group having a carbon number of 1 to 3.

10. A liquid crystal display element, comprising the liquid crystal composition according to claim 1.

11. A liquid crystal display, comprising the liquid crystal display element according to claim 10.

12. The liquid crystal composition according to claim 1, wherein the component (A) further includes a compound represented by formula (a1) or (a2):

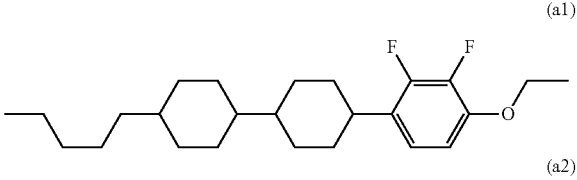
(a1)

(a2)

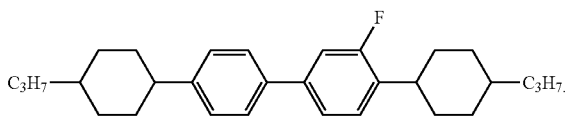

13. The liquid crystal composition according to claim 1, wherein the component (B) further includes a compound represented by formula (b1):

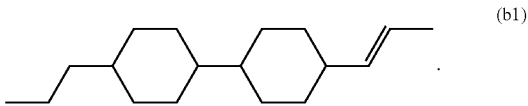
(b1)

* * * * *